US010802160B2

(12) United States Patent
Dai et al.

(10) Patent No.: US 10,802,160 B2
(45) Date of Patent: Oct. 13, 2020

(54) RAPID DETERMINATION OF PRECISE POSITION BY AIDING DATA

(71) Applicant: Deere & Company, Moline, IL (US)

(72) Inventors: Liwen L. Dai, Torrance, CA (US); Soon Sik Hwang, Torrance, CA (US)

(73) Assignee: Deere & Company, Moline, IL (US)

( * ) Notice: Subject to any disclaimer, the term of this patent is extended or adjusted under 35 U.S.C. 154(b) by 835 days.

(21) Appl. No.: 15/288,416

(22) Filed: Oct. 7, 2016

(65) Prior Publication Data

US 2017/0269216 A1    Sep. 21, 2017

Related U.S. Application Data

(60) Provisional application No. 62/310,087, filed on Mar. 18, 2016.

(51) Int. Cl.
*G01S 19/44* (2010.01)
*G01S 19/04* (2010.01)
*G01S 19/32* (2010.01)
*G01S 19/05* (2010.01)
*G01S 19/25* (2010.01)

(52) U.S. Cl.
CPC ............ *G01S 19/44* (2013.01); *G01S 19/04* (2013.01); *G01S 19/05* (2013.01); *G01S 19/25* (2013.01); *G01S 19/32* (2013.01)

(58) Field of Classification Search
CPC .......... G01S 19/04; G01S 19/05; G01S 19/25; G01S 19/32; G01S 19/44
See application file for complete search history.

(56) References Cited

U.S. PATENT DOCUMENTS

| 5,757,646 | A |   | 5/1998  | Talbot et al. |
| 5,935,194 | A | * | 8/1999  | Talbot ............... G01S 19/44 342/457 |
| 5,991,691 | A | * | 11/1999 | Johnson .............. G01S 19/15 342/357.27 |
| 7,119,741 | B2 |  | 10/2006 | Sharpe et al. |

(Continued)

FOREIGN PATENT DOCUMENTS

EP    2759849 A1    7/2014
WO   2012128980 A1  9/2012

OTHER PUBLICATIONS

The International Search Report and the Written Opinion of the International Searching Authority issued in counterpart application No. PCT/US2017/018585, dated May 11, 2017 (15 pages).

(Continued)

*Primary Examiner* — Cassi J Galt

(57) ABSTRACT

A relative positioning module applies a real-time kinematic (RTK) algorithm to provide relative position vector between reference receiver and rover receiver and to provide recovery data. At the rover, the precise positioning module applies the relative position vector, the aiding data, recovery data, and correction data as inputs, constraints, or both for convergence of one or more predictive filters on wide-lane and narrow-lane ambiguities (e.g., in accordance with a precise positioning algorithm). At the rover, the precise positioning module or the navigation positioning estimator estimates a precise position of the rover based on the converged or fixed narrow-lane ambiguities and wide-lane ambiguities.

21 Claims, 10 Drawing Sheets

(56) References Cited

U.S. PATENT DOCUMENTS

| | | | | |
|---|---|---|---|---|
| 7,961,143 | B2* | 6/2011 | Dai | G01S 19/44 342/357.27 |
| 8,368,590 | B2 | 2/2013 | Vollath et al. | |
| 8,368,591 | B2 | 2/2013 | Talbot et al. | |
| 8,542,146 | B2 | 9/2013 | Vollath | |
| 9,057,780 | B2 | 6/2015 | Bar-Sever et al. | |
| 9,116,228 | B2* | 8/2015 | Ellum | G01S 19/04 |
| 9,128,176 | B2 | 9/2015 | Seeger | |
| 9,146,319 | B2 | 9/2015 | Leandro | |
| 9,915,736 | B2* | 3/2018 | Ferguson | G01S 19/44 |
| 10,260,888 | B2* | 4/2019 | Takahashi | G01C 21/28 |
| 2005/0151683 | A1 | 7/2005 | Sharpe et al. | |
| 2006/0017611 | A1 | 1/2006 | Hatch et al. | |
| 2008/0074319 | A1 | 3/2008 | Han et al. | |
| 2009/0093959 | A1 | 4/2009 | Scherzinger et al. | |
| 2009/0184869 | A1 | 7/2009 | Talbot et al. | |
| 2011/0122020 | A1 | 5/2011 | Henkel | |
| 2012/0154210 | A1 | 6/2012 | Landau et al. | |
| 2012/0176271 | A1 | 7/2012 | Dai et al. | |
| 2014/0015712 | A1 | 1/2014 | Leandro et al. | |
| 2016/0011314 | A1 | 1/2016 | Chen et al. | |

OTHER PUBLICATIONS

Chassagne, Olivier. "The Future of Satellite Navigation, One-Centimeter Accuracy with PPP", GNSS Forum, pp. 51-54, Mar.-Apr. 2012 [online] [retrieved on Aug. 31, 2016]. Retrieved from the Internet: <URL:http://www.insidegnss.com/auto/marapr12-Chassagne.pdf>.
Choy, Suelynn. "GNSS Precise Point Positioning: A Fad or the Future of Satellite Navigation and Positioning?" Lecture slides [online].School of Mathematical and Geospatial Sciences Royal Melbourne Institute of Technology University, Australia, 2014 [retrieved on Aug. 31, 2016]. Retrieved from the Internet: <URL:http://www.fig.net/resources/proceedings/fig_proceedings/fig2014/ppt/TS05A/Choy.pdf>.
Murfin, Tony. "Hexagon's Acquisition of Veripos: Why Did This Go Down?" GPS World [online], Apr. 16, 2014 [retrieved on Aug. 31, 2016]. Retrieved from the Internet: <URL:http://gpsworld.com/hexagons-acquisition-of-veripos-why-did-this-go-down/>.
Murfin, Tony. "Look, No Base-Station!—Precise Point Positioning (PPP)." GPS World [online], Mar. 20, 2013 [retrieved Aug. 31, 2016]. Retrieved from the Internet: <URL:http://gpsworld.com/look-no-base-station-precise-point-positioning-ppp/>.
Laurichesse, Denis. "Innovation: Carrier-Phase Ambiguity Resolution, Handling the Biases for Improved Triple-Frequency PPP Convergence." GPS World, Apr. 3, 2015 [online], [retrieved Aug. 31, 2016]. Retrieved from the Internet: <URL:http://gpsworld.com/innovation-carrier-phase-ambiguity-resolution/>.
Dixon, Kevin. "StarFire: A Global SBAS for Sub-Decimeter Precise Point Positioning." NavCom Technology Inc., ION GNSS 19th International Technical Meeting of the Satellite Division [online], Sep. 26-29, 2006 [retrieved on Aug. 31, 2016]. Retrieved from the Internet: <URL:http://www.gdgps.net/system-desc/papers/starfire.pdf>.
Shi, Junbo and Gao, Yang. "A Comparison of Three PPP Integer Ambiguity Resolution Methods." GPS Solutions 18.4 [online], 2013, pp. 519-528 [retrieved on Aug. 31, 2016]. Retrieved from the Internet: <URL:http://link.springer.com/article/10.1007/s10291-013-0348-2>.
Leandro, R., et al. "RTX Positioning: The Next Generation of cm-accurate Real-Time GNSS Positioning." Trimble Terrasat GmbH [online brochure], Sep. 2012 [retrieved on Aug. 31, 2016]. Retrieved from the Internet: <URL:https://www.trimble.com/positioning-services/pdf/WhitePaper_RTX.pdf>.
Goode, Matthew. "New Developments in Precise Offshore Positioning." Ocean Business / Offshore Survey [online presentation], Apr. 15-16, 2015, Southampton, United Kingdom [retrieved on Aug. 31, 2016]. Retrieved from the Internet: <URL:http://www.oceanbusiness.com/wp-content/uploads/2015/04/1410_MatthewGoode.pdf>.
Ott, Lee. "Use of Four GNSS Systems in Operational Precise Point Positioning Service." Furgo Satellite Positioning [online presentation], 2015 [retrieved on Aug. 31, 2016]. Retrieved from the Internet: <URL:http://www.gps.gov/cgsic/meetings/2015/ott.pdf>.
Toor, Pieter. "Munich Satellite Navigation Summit 2014." Veripos, Ltd. [online presentation], Mar. 26, 2014 [retrieved on Aug. 31, 2016]. Retrieved from the Internet: <URL:URL:http://www.terrastar.net/files/docs/Munich_Summit_2014_-_PPP_Session_-_Pieter_Toor_-_VERIPOS.pdf>.
Jokinen, Altti Samuli. "Enhanced Ambiguity Resolution and Integrity Monitoring Methods for Precise Point Positioning." Centre for Transport Studies, Department of Civil and Environmental Engineering, Imperial College London [online thesis], Aug. 2014 [retrieved on Aug. 31, 2016]. Retrieved from the Internet: <URL:https://spiral.imperial.ac.uk/bitstream/10044/1/24806/1/Jokinen-A-2014-PhD-Thesis.pdf>.
"Real-time Service." International GNSS Service [online article], 2015 [retrieved on Aug. 31, 2016]. Retrieved from the Internet: <URL:http://www.igs.org/rts>.
"Introducing the IGS Real-Time Service (RTS)." International GNSS Service [online], 2015 [retrieved on Aug. 31, 2016]. Retrieved from the Internet <URL:ftp://igs.org/pub/resource/pubs/IGS_Real_Time_Service-131031.pdf>.
Duman, Angie, "PPP: IGS Announces The Launch of RTS-IGS." xyHt [online], Apr. 20, 2015 [retrieved on Aug. 31, 2016]. Retrieved from the Internet: <URL:http://www.xyht.com/professional-surveyor-archives/ppp-igs-announces-the-launch-of-rts-igs/>.
Laurichesse, D., Mercier, F., and Berthias, J. P. "Real-time PPP with Undifferenced Integer Ambiguity Resolution, Experimental Results." Proceedings of the ION GNSS [online] Sep. 21-24, 2010 [retrieved on Aug. 31, 2016]. Retrieved from the Internet <URL:http://www.ppp-wizard.net/Articles/laurichesse_ion_gnss_2010_bdp.pdf>.
Blewitt, Geoffrey. "Carrier Phase Ambiguity Resolution for the Global Positioning System Applied to Geodetic Baselines up to 2000 km." Journal of Geophysical Research [online], vol. 94, No. B8, pp. 10187-10203, Aug. 10, 1989 [retrieved on Aug. 31, 2016]. Retrieved from the Internet: <URL:http://www.colorado.edu/ASEN/asen6090/blewitt.pdf#page=1&zoom=auto,-154,811>.
Banville, Simon. "Ambiguity Resolution." BlackDot GNSS [online], Apr. 25, 2015 [retrieved on Sep. 6, 2016]. Retrieved from the Internet <URL:http://www.blackdotgnss.com/2015/04/25/ambiguity-resolution/>.
Teunissen, P.J.G. "Towards a Unified Theory of GNSS Ambiguity Resolution." Journal of Global Positioning Systems [online], vol. 2, No. 1, pp. 1-12, 2003 [retrieved on Sep. 6, 2016]. Retrieved from the Internet <URL:http://citeseerx.ist.psu.edu/viewdoc/download?doi=10.1.1.454.4430&rep=rep1&type=pdf>.
Teunissen, P.J.G. "Least-Squares Estimation of the Integer GPS Ambiguities." International Association of Geodesy General Meeting, Section IV: Theory and methodology, Beijing, China, 1993 [online] retrieved on Sep. 6, 2016]. Retrieved from the Internet: <URL:http://citeseerx.ist.psu.edu/viewdoc/download?doi=10.1.1.475.9393&rep=rep1&type=pdf>.
"Hemisphere GNSS Debuts Atlas GNSS Correction Service." GPS World Staff. GPS World [online], Jun. 15, 2015 [retrieved on Sep. 6, 2016]. Retrieved from the Internet: <URL:http://gpsworld.com/hemisphere-gnss-debuts-atlas-gnss-correction-service/>.
Teunissen, P.J.G. "GNSS Ambiguity Bootstrapping: Theory and Application." Proceedings of International Symposium on Kinematic Systems in Geodesy, Geomatics and Navigation [online], pp. 246-254, Jun. 2001 [retrieved on Nov. 16, 2016]. Retrieved from the Internet <URL:http://www.ucalgary.ca/engo_webdocs/SpecialPublications/KIS%2001/PDF/0503.PDF>.
Teunissen, P.J.G. "Theory of Integer Equivariant Estimation with Application to GNSS." Journal of Geodesy [online], vol. 77, No. 7-8, pp. 402-410, 2003 [retrieved on Nov. 16, 2016]. Retrieved from the Internet <URL:http://link.springer.com/article/10.1007/s00190-003-0344-3>.
Wen, Zhibo, et al. "Best Integer Equivariant Estimation for Precise Point Positioning." Institute for Communications and Navigation

(56) References Cited

OTHER PUBLICATIONS

2012 Proceedings [online], pp. 279-282, Sep. 12-14, 2012 [retrieved on Sep. 6, 2016]. Retrieved from the Internet <URL:http://ieeexplore.ieee.org/xpls/abs_all.jsp?arnumber=6338525&tag=1>.
Shi, J., and Gao, Y. "A Fast Integer Ambiguity Resolution Method for PPP." Proceedings of the ION GNSS [online], Nashville, TN, pp. 3728-3734, Sep. 17-21, 2012 [retrieved on Nov. 16, 2016]. Retrieved from the Internet <URL:https://www.ion.org/publications/abstract.cfm?articleID=10548>.
Teunissen, P.J.G. "The Least-squares Ambiguity Decorrelation Adjustment: A Method for Fast GPS Integer Ambiguity Estimation." Journal of Geodesy [online], vol. 70, No. 1-2 pp. 65-82, 1995 [retrieved on Nov. 16, 2016]. Retrieved from the Internet <URL:http://link.springer.com/article/10.1007/BF00863419>.
De Jonge, P. and Tiberius, C. "The LAMBDA Method for Integer Ambiguity Estimation: Implementation Aspects." Publications of the Delft Computing Centre [online], LGR-Series No. 12, pp. 1-47, Aug. 1996 [retrieved on Sep. 6, 2016]. Retrieved from the Internet <URL:http://www.citg.tudelft.nl/fileadmin/Faculteit/CiTG/Over_de_faculteit/Afdelingen/Afdeling_Geoscience_and_Remote_Sensing/pubs/lgr12.pdf>.
Chang, X. W., Yang, X. and Zhou, T. "MLAMBDA: A Modified LAMBDA Method for Integer Least-squares Estimation." Journal of Geodesy [online], vol. 79, No. 9, pp. 552-565, Dec. 2005 [retrieved on Sep. 6, 2016]. Retrieved from the Internet <URL:http://www.cs.mcgill.ca/~chang/pub/MLAMBDA.pdf>.
Baroni, Leandro and Kuga, Helio K. "Evaluation of Two Integer Ambiguity Resolution Methods for Real Time GPS Positioning." WSEAS Transactions on Systems 8.3, pp. 323-333, Mar. 2009 [retrieved on Sep. 6, 2016]. Retrieved from the Internet <URL:https://www.researchgate.net/profile/Helio_Kuga/publication/41146341_Evaluation_of_Two_Integer_Ambiguity_Resolution_Methods_for_Real_Time_GPS_Positioning/links/543687fe0cf2bf1f1f2bd8d1.pdf>.
Verhagen, Sandra. "The GNSS Integer Ambiguities: Estimation and Validation." Delft Institute of Earth Observation and Space Systems, Delft University of Technology, Jan. 31, 2005 "retrieved on Sep. 6, 2016". Retrieved from the Internet <URL:http://repository.tudelft.nl/islandora/object/uuid:07c6f2be-3a70-42aa-97b3-894a5770454d/?collection=research>.
Lin, P. and Zhang, X. "Precise Point Positioning With Partial Ambiguity Fixing." Sensors [online journal], vol. 15, No. 6, pp. 13627-13643, Jun. 10, 2015 [retrieved on Sep. 6, 2016]. Retrieved from the Internet:<URL:http://www.mdpi.com/1424-8220/15/6/13627/htm>.
Verhagen, Sandra, et al. "GNSS Ambiguity Resolution: Which Subset to Fix?" IGNSS Symposium 2011, International Global Navigation Satellite Systems Society, University of New South Wales, Sydney, Australia, Nov. 15-17, 2011 [retrieved on Sep. 6, 2016]. Retrieved from the Internet:<URL:http://repository.tudelft.nl/islandora/object/uuid:075deb5b-5253-4daf-97be-f7126519612b/?collection=research>.
Pan, L., Cai, C., Santerre, R. and Zhu, J. "Combined GPS/GLONASS Precise Point Positioning with Fixed GPS Ambiguities." Sensors [online journal], vol. 14, No. 9, pp. 17530-17547, Sep. 18, 2014 [retrieved on Sep. 6, 2016]. Retrieved from the Internet: <URL:http://www.mdpi.com/1424-8220/14/9/17530/htm>. <DOI:10.3390/s140917530>.
Gratton, L., Joerger, M. and Pervan, B. "Carrier Phase Relative RAIM Algorithms and Protection Level Derivation." Journal of Navigation [online], vol. 63, No. 2, pp. 215-231, Apr. 1, 2010 [retrieved on Sep. 6, 2016]. Retrieved from the Internet: <URL:https://www.cambridge.org/core/journals/journal-of-navigation/article/div-classtitlecarrier-phase-relative-raim-algorithms-and-protection-level-derivationdiv/AEA4489E97E3C131EBD3E2184B3F0DD7> <DOI:10.1017/S0373463309990403>.
"Trimble XFill RTK." Trimble Navigation [online white paper], Sep. 2012 [retrieved on Sep. 6, 2016] Retrieved from the Internet: < URL: http://tri.trimble.com/docushare/dsweb/Get/Document-630776/022543-551_Trimble%20xFill%20White%20Paper_1012_sec.pdf>.
NovAtelCORRECT. NovAtel Inc. [online brochure], Nov. 2015 [retrieved on Sep. 6, 2016]. Retrieved from the Internet: <URL: http://www.novatel.com/assets/Documents/Papers/NovAtelCORRECT-Brochure.pdf>.
Reußnerr, N. and Wanniger, L. "GLONASS Inter-frequency Code Biases and PPP Carrier-Phase Ambiguity Resolution." Geodetic Institute, Technische Universität Dresden, IGS Workshop, Jul. 2012 [retrieved Aug. 31, 2016]. Retrieved from the Internet: <URL:https://tu-dresden.de/bu/umwelt/geo/gi/gg/ressourcen/dateien/veroeffentlichungen/gs2012.pdf?lang=en>.
Sleewagen, J., et al. <Digital versus Analog: Demystifying GLONASS Inter-Frequency Carrier Phase Biases.> Inside GNSS [online], May/Jun. 2012 [retrieved Aug. 31, 2016]. Retrieved from the Internet:<URL:http://www.insidegnss.com/auto/mayjune12-Sleewaegen.pdf>.
Carcanague, S., et al. "Finding the Right Algorithm Low-Cost, Single-Frequency GPS/GLONASS RTK for Road Users." Inside GNSS [online], vol. 8 No. 6, pp. 70-80, Nov./Dec. 2013 [retrieved Aug. 31, 2016]. Retrieved from the Internet:<URL:http://www.insidegnss.com/auto/novdec13-WP.pdf>.
Wang, J. and Feng, Y. "Reliability of Partial Ambiguity Fixing with Multiple GNSS Constellations." Journal of Geodesy [online], vol. 87, No. 1, pp. 1-14, Jun. 12, 2012 [retrieved Aug. 31, 2016]. Retrieved from the Internet:<URL: http://link.springer.com/article/10.1007/s00190-012-0573-4> <DOI:10.1007/s00190-012-0573-4>.
European Search Report issued in counterpart European Patent Application No. 17767143.5, dated Oct. 31, 2019 (8 pages).

* cited by examiner

FIG. 4A
FIG. 4B
FIG. 4

RAPID DETERMINATION OF PRECISE POSITION BY AIDING DATA

RELATED APPLICATION

This document (including the drawings) claims priority and the benefit of the filing date based on U.S. provisional application No. 62/310,087, filed Mar. 18, 2016 under 35 U.S.C. § 119 (e), where the provisional application is hereby incorporated by reference herein.

FIELD OF DISCLOSURE

This disclosure relates to a method and satellite receiver system for rapid determination of precise position by aiding data.

BACKGROUND

In certain prior art, satellite navigation receivers, such as Global Navigation Satellite System) receivers, can provide centimeter level estimates of position. Such satellite navigation receivers often rely upon carrier phase measurements that are subject to integer ambiguities of a cycle of the received satellite signal. In some prior art, long initialization periods, also known as pull-in times, are typically 30 to 45 minutes, driven by the time it takes for phase ambiguities to converge to near stable values and for the solution to reach or approach its optimal precision. Prior to the satellite navigation receiver resolving the integer ambiguities of the carrier phase measurements, the precision of the position estimates is degraded.

In some prior art, real-time kinematic (RTK) correction data for the navigation receiver is locally valid, rather than globally valid and requires a significant investment in real-time kinematic base stations and communications links to support communications between a base station and a mobile satellite navigation receiver. RTK navigation applications typically have been restricted to a short range of about 20 kilometers to 30 kilometers for single baseline between the base station and rover because of distance-dependent biases between the receiver and base station.

Thus, there is need for a navigation receiver that can rapidly determine its precise position by aiding data and that can use globally valid correction data.

SUMMARY

In accordance with one embodiment, the reference receiver or a measurement module of the reference receiver measures carrier phase and code phase of received satellite signals. At the reference receiver, the precise positioning module or navigation positioning estimator resolves wide-lane ambiguities and refraction-corrected ambiguities (or narrow-lane ambiguities) based on the measured carrier phase and code phase of the received satellite signals, tropospheric delay models, and correction data (e.g. precise point position data, with precise clock and orbit data for respective satellites in accordance with a precise point positioning algorithm). At the reference receiver, at any time after reaching the converged state for ambiguity resolution of the carrier phase, the precise positioning module provides and supports wireless, transmission by a first wireless communications device, of one or more of the following aiding data (e.g., including the resolved or converged ambiguity content): resolved wide-lane ambiguities, estimated refraction-corrected ambiguities (or estimated narrow-lane ambiguities), estimated tropospheric delay bias, raw measured carrier phase and code phase of the received satellite signals, and reference receiver position.

At the mobile receiver or rover, the second wireless communications device receives the aiding data; the relative positioning module applies a real-time kinematic (RTK) algorithm to provide relative position vector between reference receiver and rover receiver and recovery data. For example, the relative positioning module uses double-difference of phase measurements between the reference receiver and the rover and two satellites to resolve double-difference RTK ambiguities, or related data, that is recovery data. At the rover, the precise positioning module applies the relative position vector, the aiding data, recovery data, and correction data as inputs, constraints, or both for convergence of one or more predictive filters on wide-lane and narrow-lane ambiguities (e.g., in accordance with a precise positioning algorithm). At the rover, the precise positioning module or the navigation positioning estimator estimates a precise position of the rover based on the converged or fixed narrow-lane ambiguities and wide-lane ambiguities.

DETAILED DESCRIPTION

Figure 1A:
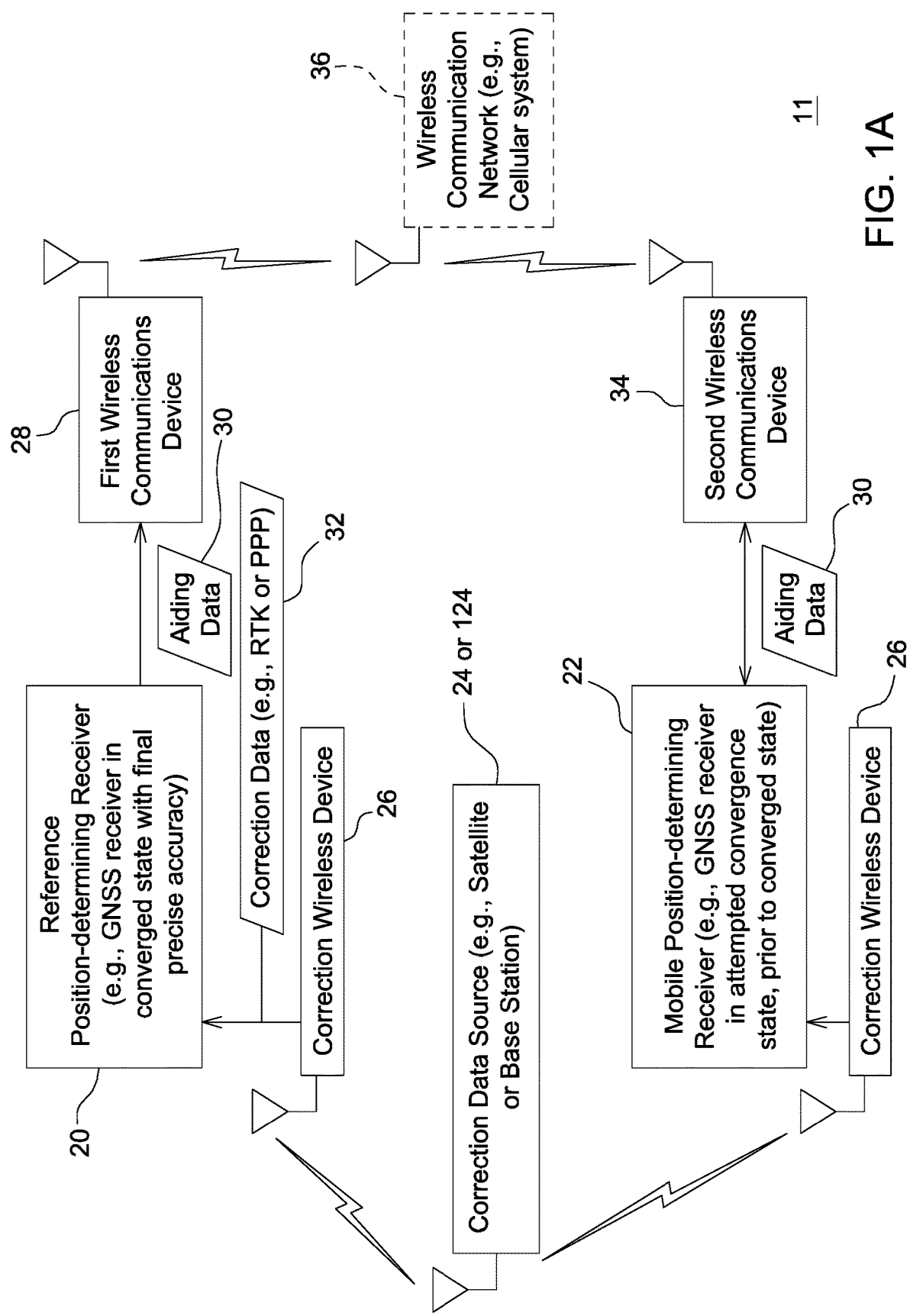
FIG. 1A is a block diagram of one embodiment of a satellite receiver system for rapid determination of precise position by aiding data.

A location-determining receiver or satellite receiver, such as a Global Navigation Satellite System (GNSS) receiver, is capable of receiving carrier phase measurements that are subject to ambiguities, such as integer ambiguities, in the number of cycles or fractional cycles of the received satellite signal. An epoch or measurement time means a specific instant in time of a navigation satellite system or the time interval during which the mobile receiver measures the carrier phase (e.g., at a certain corresponding frequency or rate). As used herein, ambiguities that are estimated, determined or "resolved" may have integer values, float values or real number values. Accordingly, estimated ambiguities, determined ambiguities and resolved ambiguities shall be regarded as synonymous terms in this document. In contrast, ambiguities that are "fixed" shall mean the ambiguities have integer values, unless otherwise specified, such as where ambiguities are divided into a fixed integer component and a real value component (float component). Converged ambiguities refer to integer or real valued ambiguities that are associated with reliable or steady-state accurate solutions or position estimates that are at or approach peak accuracy and acceptable standard deviation levels for a GNSS receiver operating in a GNSS. The receiver determines or resolves ambiguities of carrier phase measurements to estimate accurately the precise position or coordinates of the receiver. Although the code phase or pseudo-range measurements of the GNSS receiver are not associated with integer ambiguities in the cycles of the received satellite, code phase measurements do not provide the centimeter level position accuracy required for certain applications. As used throughout this document, ambiguities are often specific to the context of particular equations (e.g., later described in this document) which relate to observations from one or more receivers of carrier phase signals from one or more satellites. Accordingly, it is possible to have wide-lane (WL) ambiguities, narrow-lane (NL) ambiguities, single-difference (SD) ambiguities, double-difference (DD) ambiguities, real-time-kinematic (RTK) ambiguities, and refraction-corrected (RC) ambiguities that relate to phase measurements from one or more receivers, or one or more satellites.

If the satellite navigation receiver can receive at least two frequencies, such as L1 and L2 frequencies, the difference of the L1 and L2 carrier phase measurements can be combined to form wide-lane (WL) measurement (e.g., with a wavelength of approximately 86.25 centimeters for GPS) and the sum of the L1 and L2 carrier phase measurements can be combined to form narrow-lane (NL) measurements (e.g., with a wavelength of approximately 10.7 centimeters). The wide-lane measurements facilitate quick and efficient resolution of wide-lane integer ambiguities, whereas the narrow lane measurements facilitate precise and accurate resolution of narrow-lane ambiguities with minimal phase noise. The refraction-corrected ambiguities eliminate the first order of atmospheric delay bias.

Single difference measurements (e.g., of carrier phase or code phase) are generally formed with respect to one satellite, a reference receiver and a rover receiver, or two satellites from one receiver. In contrast, double difference measurements are generally formed with respect to two satellites, a reference receiver and a rover receiver, or by subtracting two single-difference measurements.

The measurement module 56 or navigation receiver (e.g., 20 or 22) can measure or observe the L1 and L2 carrier phases and pseudo-ranges of the applicable Global Navigation Satellite System (GNSS) (e.g., Global Positioning System (GPS) or GLONASS), as shown in Equations (1-4) as follows:

$$P_1^j = \rho^j + \tau_r + \tau^j + T + b_{P_1} + B_{P_1}^j + I^j + \varepsilon_{P_1}^j \quad (1)$$

$$P_2^j = \rho^j + \tau_r + \tau^j + T + b_{P_2} + B_{P_2}^j + \frac{f_1^2}{f_2^2} I^j + \varepsilon_{P_2}^j \quad (2)$$

$$L_1^j = \quad (3)$$
$$\Phi_1^j \lambda_1 = \rho^j + \tau_r + \tau^j + T + b_{L_1} + B_{L_1}^j - I^j + N_1^j \lambda_1 + (W^j + w)\lambda_1 + \varepsilon_{L_1}^j$$

$$L_2^j = \Phi_2^j \lambda_2 = \quad (4)$$
$$\rho^j + \tau_r + \tau^j + T + b_{L_2} + B_{L_2}^j - \frac{f_1^2}{f_2^2} I^j + N_2^j \lambda_2 + (W^j + w)\lambda_2 + \varepsilon_{L_2}^j$$

where:
$p_i^j$ and $L_i^j$ are code phase measurements and carrier phase measurements (e.g., in meters), respectively, for a given frequency i (e.g., 1, 2, ..., such as L1 or L2) and satellite j;

$\Phi_1^j$ is an ambiguous or non-integer phase measurement and $\lambda_1$ is the wavelength of the carrier phase measurement for frequency L1;

$\Phi_2^j$ is an ambiguous or non-integer phase measurement and $\lambda_2$ is the wavelength of the carrier phase measurement for frequency L2;

$\rho^j$ is the geometric distance (e.g., in meters) between the satellite j phase center and the receiver phase center including satellite precise orbital correction in the correction data 108, receiver tide displacement and earth rotation correction;

$\tau_r$ is the receiver r clock bias or error for a given GNSS system, where one receiver clock bias is estimated for each GNSS system such as GPS, GLONASS, Galileo or Beidou constellation;

$\tau^j$ is the satellite clock error for satellite j;

T is the tropospheric delay, and is divided into a dry component $T_{dry}$ and a wet component $T_{wet}$;

$b_{P_i}$ and $b_{L_i}$ are receiver dependent code bias and phase bias, respectively, for a given frequency i (1, 2, ...) and can be assumed to be same for each CDMA signal of all the visible satellites within each GNSS constellation;

$B_{P_i}^j$ and $B_{L_i}^j$ are satellite j dependent code bias and phase bias, respectively, for a given frequency i (1, 2, ...) which change very slowly over time;

$f_i$ and $\lambda_i$ are the GNSS carrier signal frequency i and its wavelength;

$I^j$ is the ionosphere error for a given satellite j;

$N_i^j$ is carrier phase integer ambiguity for a given frequency i and satellite j;

$W^j$ and w are phase windup errors for both satellite j and receiver, in cycles, respectively, which can be corrected with models;

$\varepsilon_{P_i}^j$ and $\varepsilon_{L_i}^j$ are code error and phase error, respectively, including white noise, multipath and remaining model errors for satellite j and frequency i.

In an alternate embodiment, an alternative approach for the receiver r clock bias, $\tau_r$, is the receiver r clock bias is to estimate one clock for a primary constellation such as GPS and then relative receiver clock biases between primary constellation and the other GNSS constellations. For determination of the tropospheric delay, the dry component can be accurately modeled using an a priori troposphere model such as the Global Pressure and Temperature model (GPT) or the GPT2 model; the remaining wet component, after removing an a priori wet model, can be further estimated as one zenith bias with elevation mapping function and/or additional two horizontal gradient coefficients.

If the measurement module 56 or receiver (e.g., 20 or 22) observes or measures GLONASS satellite signals, the different frequencies of different satellite transmitters must be considered. For example, the satellite signals transmitted by GLONASS satellites can be derived from a fundamental frequency (1602 MHz for L1 band, 1246 MHz for L2 band) of the satellite L-Band. Each GLONASS satellite currently transmits on a different frequency using an FDMA technique. The equation to give the exact L1 center frequency is as follows:

$$f_1^j = 1602 \text{ MHz} + n^j \times 0.5625 \text{ MHz} \quad (5)$$

where $n^j$ is frequency channel number (n=−7, −6, ..., 6) of satellite j. On the L2 band, the center frequency is determined by the equation $$f_2^j = 1246 \text{ MHz} + n^j \times 0.4375 \text{ MHz} \tag{6}$$

FIG. 1A is a block diagram of one embodiment of a satellite receiver system 11 for rapid determination of precise position by aiding data 30. A correction data source (24 or 124) transmits a wireless correction signal that contains correction data 32. The correction data source (24 or 124) may comprise the correction data source 24 of FIG. 1B or the correction source 124 of FIG. 1C. The correction data 32 may comprise precise orbit and clock corrections and any other satellite bias data that is necessary or useful to provide a precise point position (PPP) data services (e.g., with centimeter-level accuracy) to position-determining receivers in one or more geographic regions or throughout the world. The correction data 32 with additional satellite bias data enable mobile receivers to quickly converge and pull-in to precise accuracy (e.g., centimeter level accuracy) or peak accuracy levels.

In this disclosure, the precise point positioning (PPP) algorithm can provide centimeter level accuracy, using the correction data 32, which includes a single set of clock and orbit corrections with global validity, generated from a sparse global network of reference stations. Unlike certain prior art real-time kinematic systems for providing correction data 32, PPP eliminates the need for a dense network of real-time kinematic (RTK) base stations and associated wireless communications links to support determination of correction data 32 with local validity or communications of a correction signal between an RTK base station and rover 22.

As illustrated in FIG. 1A, a reference position-determining receiver or reference receiver 20 receives satellite signals from a first set of satellites within view or reliable reception range. In one configuration, a received satellite signal has a carrier signal that is encoded with a pseudo-random noise code or other spread-spectrum code. The reference receiver 20 is coupled to or in communication with a correction wireless device 26 that receives correction data 32 from the correction data source (24 or 124) via the transmitted wireless correction signal.

The mobile position-determining receiver or rover 22 receives satellite signals from a second set of satellites within view or reliable reception range. As used in this document, the terms rover 22 and mobile receiver shall be synonymous. For the RTK algorithm, which can be executed by the relative positioning module 18 (in FIG. 2), there needs to be commonality between the member satellites in the first and second sets of satellites within view or reliable range of the reference receiver 20 and the rover 22. However, for the PPP algorithm executed by the precise positioning module 16 (in FIG. 2) in the rover 22, the rover 22 may use additional satellites that are not within the first set.

For the relative positioning module 18 or real-time kinematic filter 48 (in FIG. 2) to provide accurate results, the reference receiver 20 and the rover 22 need to be within a maximum range or distance of each other. For example, if the reference receiver 20 and the rover 22 are within a maximum of range of zero to approximately thirty kilometers, the double difference equations used by the real-time kinematic filter 48 can provide accurate results. In alternate embodiments, if the reference receiver 20 and the rover 22 are within a maximum of range of zero to approximately fifty kilometers, the real-time kinematic filter 48 can provide acceptable or adequate results. Accordingly, the relative positioning module 18 or real-time kinematic filter 48 may verify that the reference receiver 20 is within a range of zero to approximately thirty kilometers between to the mobile receiver or rover 22 prior to applying the real-time kinematic (RTK) filter to resolve ambiguities associated with double-difference carrier phase measurements.

The rover 22 is coupled to or in communication with a correction wireless device 26 that receives correction data 32 from the correction data source (24 or 124) via the transmitted wireless correction signal.

As illustrated in FIG. 1A, a first wireless communications device 28 is coupled to the reference receiver 20. Similarly, a second wireless communications device 34 is coupled to the rover 22. The first wireless communications device 28 may comprise a transmitter or a transceiver, whereas the second wireless communications device 34 may comprise a receiver or a transceiver. The first wireless communications device 28 and the second wireless communications device 34 may communicate directly via an electromagnetic signal, or indirectly an optional wireless communications network 36, which is indicated by dashed lines. For example, the optional wireless communications network 36 may comprise a cellular communications network, a trunking system, a terrestrial repeater, or a satellite repeater that receives an electromagnetic signal from the first wireless communications device 28 and repeats or transmits another electromagnetic signal or a derived signal to a second wireless communications device 34.

In on embodiment, with or without the optional wireless communications network 36, the first wireless communications device 28 and the second wireless communications device 34 facilitate the formation of a radio communications channel between the reference receiver 20 and the mobile receiver 22 (e.g., the data message can be sent over a wireless channel, such as wireless phones on a wireless network at mobile receiver and receiver or on a private wireless communications system).

As illustrated in FIG. 1A, the reference receiver 20 attains a converged state with final precise accuracy after resolving ambiguities associated with the carrier phase signals based on the received correction data 32 in accordance with a precise point position algorithm or a precise positioning module 16.

Figure 1B:
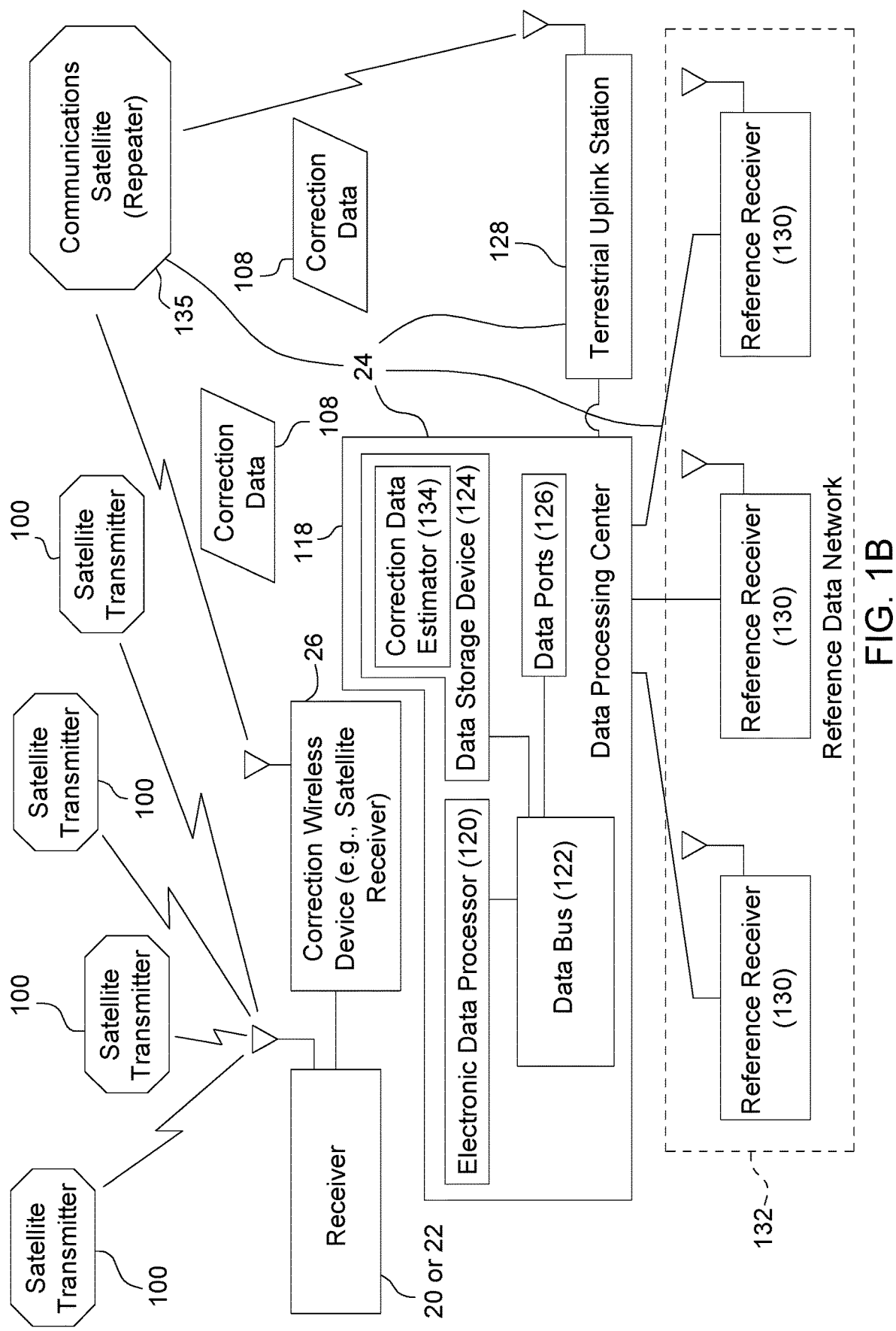
FIG. 1B is a block diagram that illustrates one possible example of the correction data source (of FIG. 1A) that comprises a communications satellite for broadcast of the correction data to the mobile receiver.
Figure 1C:
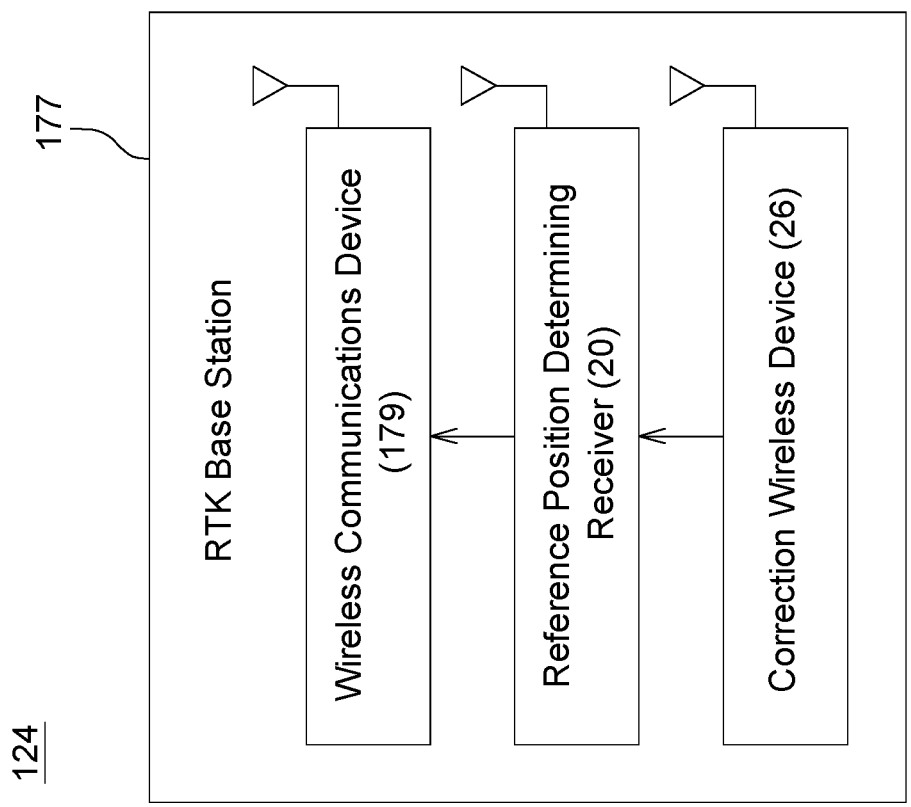
FIG. 1C is a block diagram that illustrates another possible example of the correction data source (of FIG. 1A) that comprises an RTK base station.

In an alternate embodiment, the reference receiver 20 attains a converged state with final precise accuracy after resolving ambiguities associated with the carrier phase signals based on the received correction data 32 in accordance with a real-time kinematic (RTK) positioning algorithm or other differential correction algorithm, consistent with the RTK base station of FIG. 1C as a correction data source 124.

At any time after the reference receiver 20 reaches the converged state, for ambiguity resolution of the carrier phase, the precise positioning module 16 provides and supports wireless, transmission by a first wireless communications device 28, of one or more of the following aiding data 30 (e.g., including the resolved or converged ambiguity content): resolved wide-lane ambiguities (e.g., fixed integer values or real number valued); estimated narrow-lane ambiguities (e.g., fixed integer values, real number values or float) or estimated refraction-corrected ambiguities; estimated tropospheric delay bias (e.g., residual tropospheric bias, tropospheric delay at zenith direction including the a priori model), raw measured carrier phase, measured code phase of the received satellite signals, and reference receiver position, and position offset (e.g., between RTK and PPP reference frame or between the position states in RTK filter 48 and the precise positioning module 16). In one example, the position offset or position offset vector comprises the offset vector between the precise position (e.g., precise point position, PPP solution) at the reference receiver 20 and reference coordinates, where the precise position is provided by the precise positioning module 16 over a first measurement time period and where the reference coordinates may comprise: (1) known reference coordinates of the reference receiver 20 at the first measurement time period (e.g., if the reference receiver 20 is stationary or aligned with known reference position), or (2) a corresponding RTK position by the relative positioning module 18 or the RTK filter 48 over the first measurement time period for the reference receiver 20, or (3) any offset vector from a RTK data message of any available RTK base station 177 within an acceptable range of the mobile receiver 22 and reference receiver 20 at the first measurement time period. Generally, the resolved ambiguities comprise the pulled-in wide-lane and narrow-lane ambiguities (or refraction-corrected ambiguities) from one or more GNSS satellites' carrier signals the absolute tropospheric delay at zenith direction including a priori model and residual tropospheric delay estimates.

At the mobile receiver or rover 22, the second wireless communications device 34 receives the aiding data 30; the relative positioning module 18 applies a real-time kinematic (RTK) algorithm to provide relative position vector between reference receiver 20 and rover 22 receiver and recovery data. For example, the relative positioning module 18 uses double-difference of phase measurements between the reference receiver 20 and the rover 22 and two satellites to resolve double-difference RTK ambiguities, or related data, that are used as recovery data. At the rover 22, the precise positioning module 16 applies the relative position vector, the aiding data 30, recovery data, and correction data 32 as inputs, constraints, or both for convergence of one or more predictive filters on wide-lane and narrow-lane ambiguities (or refraction-corrected ambiguities) (e.g., in accordance with a precise positioning algorithm). In one example, the recovery data comprises L1/L2 fixed double-difference (DD) ambiguities from the Real-time kinematic filter 48 at the mobile receiver based on raw phase measurements at the mobile receiver and the reference receiver 20 for a respective pair of satellites. In this document, double-differenced L1/L2 integer ambiguities or real-time kinematic (RTK) double-differenced L1/L2 ambiguities means any of the following: DD L1 RTK integer ambiguities, DD L2 RTK integer ambiguities or both. At the rover 22, the precise positioning module 16 or the navigation positioning estimator 50 estimates a precise position of the rover 22 based on the converged or fixed narrow-lane ambiguities (or refraction-corrected ambiguities) and wide-lane ambiguities.

In one embodiment, it is possible that one or more reference receivers 20 are controlled by, leased to, or under a contractual obligation to a service provider to provide aiding data 30 to one or more subscribers for a rapid convergence to the ambiguity resolution and precise position estimation for the mobile receiver/subscriber that is authorized to receive the aiding data 30, which might be encrypted to prevent non-subscribers from reading or decoding it with payment of the applicable fee or adherence to other license terms and conditions.

In an alternate embodiment, it is possible that the roles of the reference receiver 20 and the rover 22 are swapped, such that the mobile or stationary rover 22 that is converged with resolved ambiguities can become a reference station for another receiver or the original reference receiver 20 that is not acting as a rover 22 in an non-converged state.

FIG. 1B is a block diagram that illustrates one possible example of the correction data source (of FIG. 1A) that comprises a communications satellite 135 for broadcast of the correction data 32 to the mobile receiver 22. In one embodiment, the correction data source 24 comprises an electronic system for generation and distribution of correction data 32. As illustrated in FIG. 1B, the correction data source 24 comprises a reference data network 132, a data processing center 118, a terrestrial uplink station 128 and a communications satellite 135.

In one embodiment, reference receiver 130 measures the carrier phase of one or more of the carrier signals or received satellite signals from a set of satellite transmitters 100 on satellites orbiting the Earth. The reference receiver 130 can also measure the pseudo-range or code phase of a pseudo-random noise code that is encoded on one or more of the carrier signals from the set of satellite transmitters 100. The reference receivers 130 receive and send measurements, ephemeris data, other observables and any information derived from the deliverables to an electronic data processing center 118 (e.g., hub). In one embodiment, each reference receiver 130 transmits (e.g., via a communications link, a communications network, a wireless channel, a communications channel, communications line, a transmission line, or otherwise) a set of carrier phase measurements of received satellite signals, and associated satellite identifiers, and ephemeris data to an electronic data processing center 118 (e.g., reference data processing hub).

The data processing center 118 or its correction data estimator 134 determines correction data 32 (e.g., precise correction data) in real time based on the measurements, ephemeris data, other observables and any derived information received from one or more reference receivers 130. In one embodiment, the data processing center 118 comprises an electronic data processor 120, a data storage device 124, and one or more data ports 126 that are coupled to a data bus 122. The data processor 120, the data storage device 124 and the one or more data ports 126 may communicate with each other via the data bus 122.

Software instructions and data that are stored in the data storage device 124 may be executed by the data processor 120 to implement any of the blocks, components or modules (e.g., electronic modules, software modules, or both) described in this disclosure document. The data processor 120 may comprise a microcontroller, a microprocessor, a programmable logic array, an application specific integrated circuit (ASIC), a digital signal processor, or another device for processing data, manipulating, accessing, retrieving, and storing data. A data storage device 124 may comprise electronic member, non-volatile electronic memory, an optical storage device, a magnetic storage device, or another device for storing digital or analog data on a tangible storage medium, such as an optical disk, a magnetic disk, or electronic memory. Each data port 126 may comprise a buffer memory, a transceiver or both for interfacing with other network elements, such as a reference receiver 130 or a terrestrial satellite uplink station 128.

In one embodiment, the data processing center 118 or data processor 120 or correction data estimator 134 receives the phase measurements and corresponding satellite identifiers from the reference receivers 130, reference receiver identifiers (or corresponding coordinates) and processes the phase measurements to estimate a clock bias for each satellite, or rather each satellite signal, or a corresponding clock solution for incorporation into correction data 108. As illustrated in FIG. 1A, the clock solution, clock bias or correction data 32 is provided to a terrestrial uplink station 128 or another communications link. For example, the terrestrial uplink station 128 communicates or transmits the clock solution, clock biases or correction data 32 to a communications satellite 135 (e.g., repeater).

In turn, the communications satellite 135 transmits the correction data 32 to a correction wireless device 26 (e.g., a satellite receiver or L-band satellite receiver) at a mobile receiver 22 and a reference receiver 20. The correction wireless device 26 is coupled to a mobile receiver 22 (e.g., mobile GNSS receiver) or rover. The mobile receiver 22 and the reference receiver 20 each receive satellite signals from one or more GNSS satellites and measures the carrier phase (and code phase) of the received satellite signals. In conjunction with the phase measurements, the precise clock solutions or clock biases in the correction data 32 can be used to estimate the precise position, attitude, or velocity (e.g., solution) of the mobile receiver 22, or its antenna and at the reference receiver 20, or its antenna. For example, the mobile receiver 22 may employ a precise point positioning (PPP) estimate using precise clock and orbital solutions for the received signals of the satellites.

FIG. 1C is a block diagram that illustrates another possible example of the correction data source 124 (of FIG. 1A) that comprises an RTK base station 177. Like reference numbers in FIG. 1A and FIG. 1B indicate like elements. In one embodiment, the RTK base station 177 comprises a reference receiver 20 with an RTK filter 48 or RTK estimator and a precise positioning estimator 16. A correction wireless device 26 is coupled to the reference receiver 20 of the RTK base station 177 to provide correction data 32 to the reference receiver 20. A wireless communications device 179 is coupled to the reference receiver for transmitting or communicating RTK data messages, including offset vectors, or differential correction data to a mobile receiver 22 within available range.

Figure 1D:
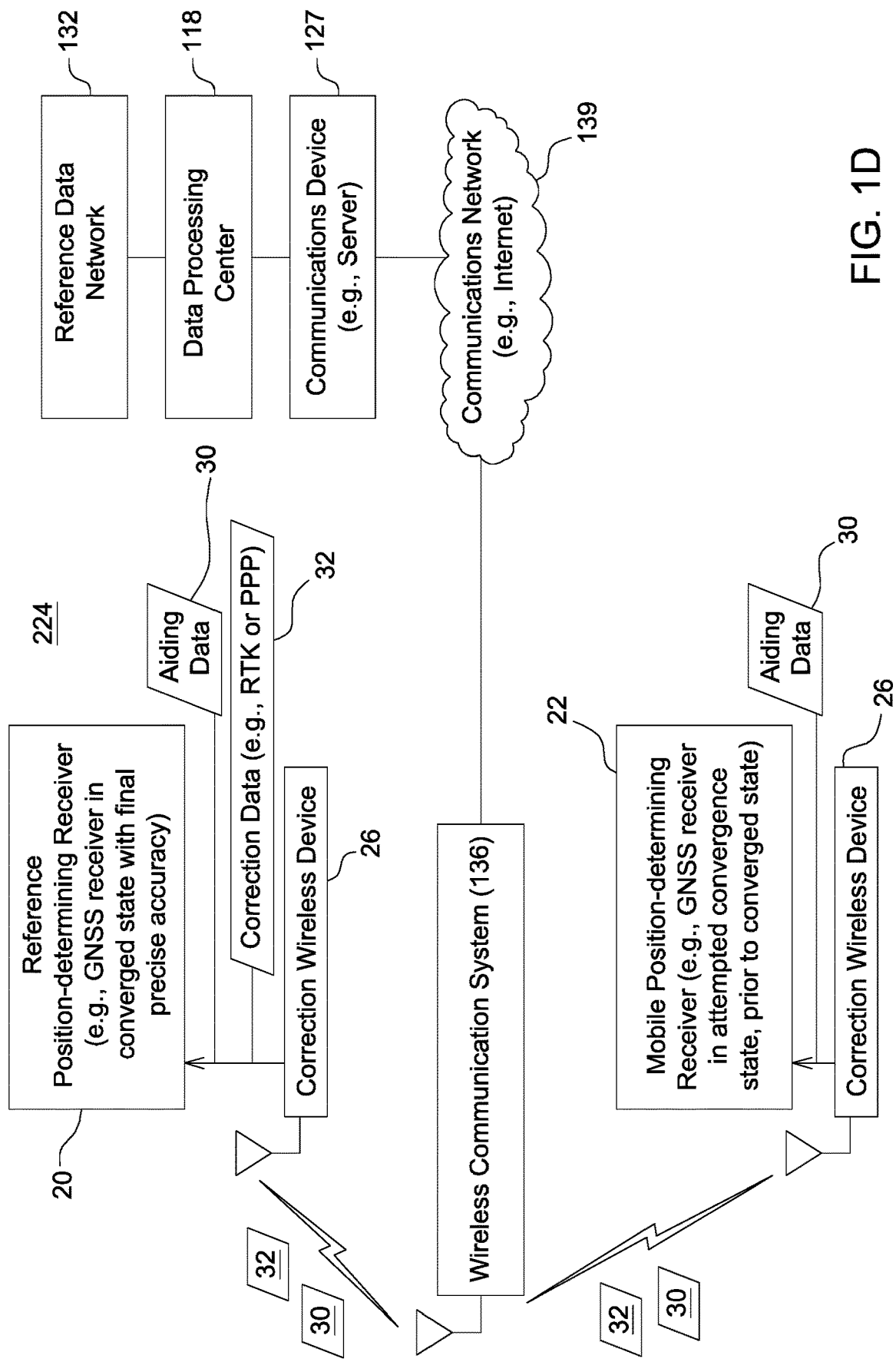
FIG. 1D is a block diagram of another embodiment of a satellite receiver system for rapid determination of a precise position by aiding data, where both the aiding data and the correction data can be communicated via correction wireless devices and one or more wireless communication systems.

FIG. 1D is a block diagram of another embodiment of a satellite receiver system for rapid determination of a precise position by aiding data, where both the aiding data and the correction data can be communicated via correction wireless devices and one or more wireless communication systems. Like reference numbers in FIG. 1A, FIG. 1B and FIG. 1D indicate like elements or features.

As illustrated in FIG. 1D, the satellite receiver system 224 comprises a reference data network 132, a data processing center 118, a communications device 127 (e.g., server), a communications network 139 (e.g., Internet), and one or more wireless communication systems 136. If multiple wireless communication systems 136 are used, the wireless communication systems 136 may communicate via a communications link, communications lines, fiber optic cable, or a communications network. In one embodiment, each wireless communications system 136 may comprise a cellular communications system, a trunking system, a WiFi communications system, or another communications system. For example, the cellular communications system may comprise cell sites or base stations in communication with a base station controller, a router, or another mobile telephone switching office (MTSO), where the MTSO interfaces with a communications network 139, such as the Internet.

The communications network 139 may comprise microwave links, fiber optical links, the public switched telephone network (PSTN), the Internet, or another electronic communications network. In one embodiment, the communications device 127 comprises a server that formats, organizes or transmits the correction data in data packets (e.g., data packets compatible with TCP/IP Transmission Control Protocol/Internet Protocol) for transmission over the communications network 139. The communications network 139 communicates with wireless communications system 136, which in turn communicates with the correction wireless device 26 (e.g., cellular transceiver) that is associated with or coupled to the mobile receiver 22 or the reference receiver 20.

The satellite receiver system 224 of FIG. 1D supports communications of both correction data 32 and aiding data 30 by the same correction wireless device 26. Further, each correction wireless device 26 may communicate the correction data 32 and aiding date 30 over one or more wireless communication systems 136.

Figure 2:
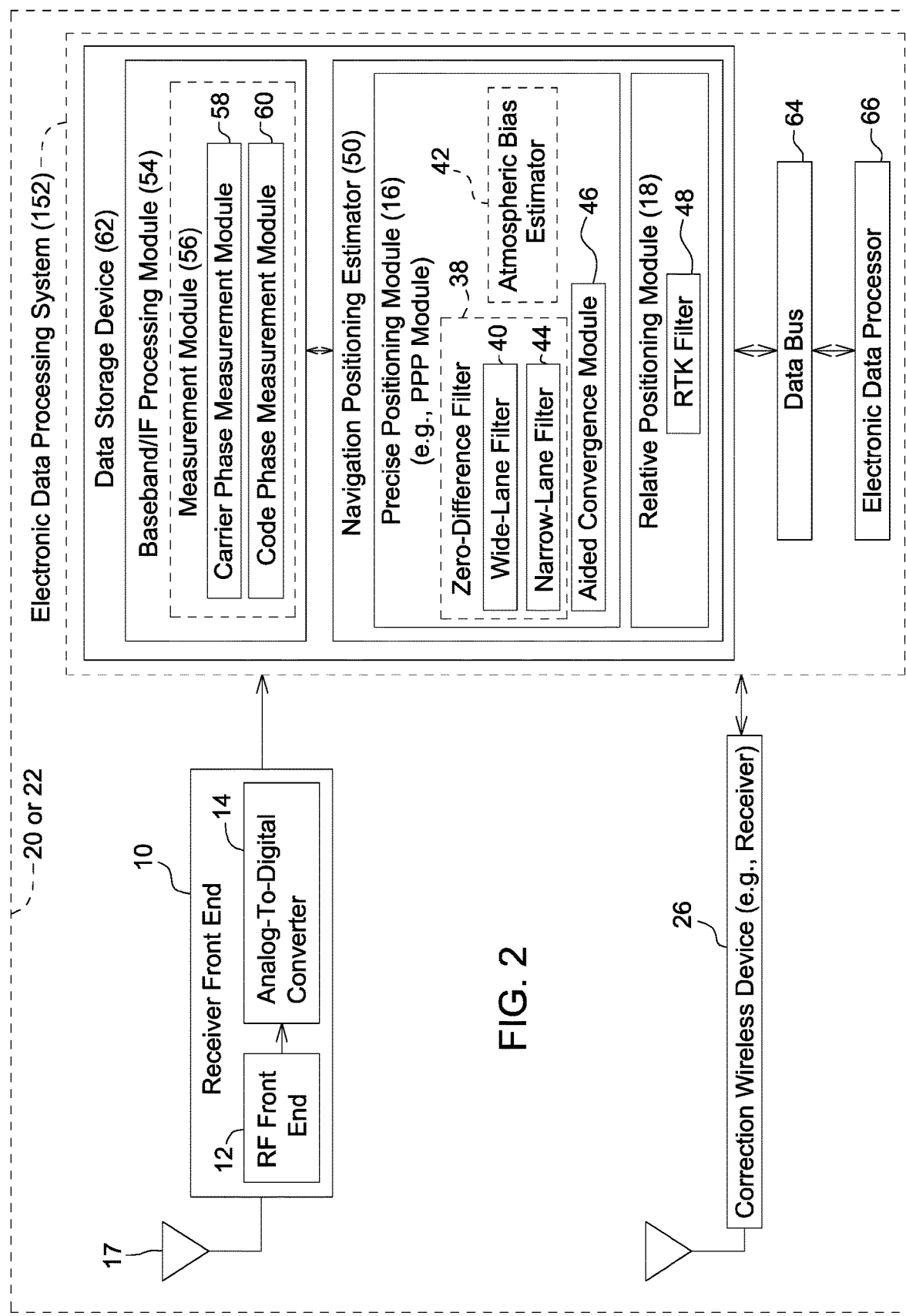
FIG. 2 is a block diagram of an illustrative example of satellite receiver shown in greater detail than FIG. 1A or FIG. 1D.

FIG. 2 is a block diagram of an illustrative example of satellite receiver shown in greater detail than FIG. 1. The position determining receiver of FIG. 2 may be used as a reference receiver 20, a rover 22 or both. For example, the reference receiver 20 operates in a converged state where the precise position (e.g., which approaches final precise accuracy) is based on resolved integer ambiguities or resolved floating integer ambiguities, whereas the mobile receiver 22 attempts to converge on resolved ambiguities in an inconvergence state or attempted convergence state. However, once the mobile receiver 22 reaches the converged state, perhaps with the assistance of aiding data, from the reference receiver 20, the converged mobile receiver 22 can then act as a reference receiver to another mobile receiver 22. In practice, the subscribers of mobile receivers 22 on the mobile network may agree to share aiding data with other subscribers on a reciprocal basis to act as reference receivers.

In one embodiment, the receiver (20 or 22) comprises a receiver front end 10 coupled to an electronic data processing system 152. The receiver front end 10 comprises an antenna 17, a radio frequency (RF) front end, and an analog-to-digital (A/D) converter 14. The RF front end 12 may include one or more of the following: an radio frequency amplifier or microwave amplifier, a filter (e.g., bandpass filter), and a downconverter for down-converting the received satellite signal to an intermediate frequency signal or a baseband signal.

The electronic data processing system 152 includes that portion of the receiver that processes data after the analog-to-digital conversion by the analog-to-digital converter 14. For example, the electronic data processing system 152 can comprise an electronic data processor 66, a data storage device 62 (e.g., electronic memory) and a data bus 64 for communication between the electronic data processor 66 and the data storage device 62, where software instructions and data are stored in the data storage device 62 and executed by the data processor 66 to implement any of the blocks, components or modules (e.g., electronic modules, software modules, or both) illustrated in FIG. 2. The receiver may comprise a location-determining receiver for: (a) determining a location or precise position (e.g. three-dimensional coordinates) of a receiver antenna, (b) a range-determining receiver for determining a range or distance between the receiver antenna and a satellite (e.g., satellite antenna), (c) determining ranges between the receiver antenna and one or more satellites, or (d) determining position, velocity, acceleration, or attitude (e.g., yaw, pitch, roll) of the mobile receiver 20 or its antenna.

The analog-to-digital converter 14 converts the analog intermediate frequency signal or analog baseband signal to a digital signal. The digital signal comprises one or more digital samples that are available at a sampling rate. Each sample has a finite quantization level and each sample is capable of being processed by an electronic data processing system 152.

In one embodiment, the data storage device 62 stores the following modules or components: baseband/intermediate frequency processing module 54, measurement module 56, and navigation positioning estimator 50.

The baseband/intermediate frequency (IF) processing module 54 or measurement module 56 processes the digital signals. The measurement module 56 or a carrier phase measurement module 58 measures or detects the carrier phase of the received satellite signals from a set of GNSS satellites with view or reception range. For example, the measurement module 56 measures the carrier phase of the received signal by correlating the received digital signal to a locally generated reference signal. However, the measurement module 56 or carrier phase measurement module 58 measures the carrier phase of the satellite signals subject to an ambiguity or integer ambiguity in the number of cycles in any path between the receiver antenna and the satellite. The measurement module 56 or the code phase measurement module 60 measures the code phase or pseudo-range of the received satellite signals.

The baseband/intermediate frequency processing module 54 is coupled to, or in communication with, the navigation positioning estimator 50. In one embodiment, the navigation positioning estimator 50 comprises a precise positioning module 16 (e.g., PPP module) and a relative positioning module 18. In certain embodiments, the precise positioning module 16 represents a precise point position (PPP) estimator. The precise positioning module 16 can execute a precise point positioning algorithm to estimate a precise position of the receiver or its antenna based on received correction data 32 via the correction wireless device 26. In general, in one embodiment the precise positioning module 16 comprises a predictive filter, such as a Kalman filter or modified Kalman filter.

In one embodiment, the precise positioning module 16 may comprise an optional zero-difference filter 38, a wide-lane filter 40, a narrow-lane filter 44, aided convergence module 46, and an optional atmospheric bias estimator 42. The zero-difference filter 38 and the atmospheric bias estimator 42 are indicated as optional by the dashed lines in FIG. 2. Although the zero-different filter 38 may comprise a wide-lane filter 40 and a narrow-lane filter 44 as illustrated, the precise positioning module 16 can realize one or more single-difference filters or double-difference filters for the wide-lane ambiguity resolution, narrow-lane ambiguity resolution, or resolution of ionosphere-free ambiguities.

In one embodiment, the precise positioning module 16 comprises a precise point positioning module that operates in accordance with a precise point positioning algorithm. For illustrative purposes, the following equations can be used to implement one possible embodiment as follows.

The observation model that has been widely used for PPP is based on ionosphere-free code and carrier phase observations that eliminate the first order of ionosphere error as shown in equations (1-4). The observations, such as carrier phase and code phase measurements, received from all the satellites are processed together in one or more predictive filters (e.g., Kalman filters, or the combination of a wide-lane filter 40 and a narrow-lane filter 44) that solves for the different unknowns, namely the receiver coordinates, the receiver clock, the zenith tropospheric delay and the phase floating ambiguities. The accuracy of the satellite clocks and orbits is one of the most important factors affecting the quality of the PPP solution. In order to achieve its full potential to applications, PPP faces two major challenges including a long initialization time and robust and reliable integer ambiguity resolution to derive a more precise solution.

In one embodiment, the wide-lane filter 40, which can be applied to PPP determination, uses the following equations described below. Given the code and phase measurements from two frequencies, such as L1 and L2 for GPS, G1 and G2 for GLONASS, the Melbourne-Wübbena linear combination $L_{WL}^j$ can be formed as shown below.

$$L_{WL}^j = \left(\frac{f_1}{f_1+f_2}P_1^j + \frac{f_2}{f_1+f_2}P_2^j\right) - \left(\frac{f_1}{f_1-f_2}L_1^j - \frac{f_2}{f_1-f_2}L_2^j\right) \quad (7)$$

By expanding the above equation (7) using Equations (1)-(4), it can be shown that the geometric range related terms, which include range, receiver and satellite clock, ionosphere and troposphere errors and the phase wind-up term, are cancelled. It can be expressed in Equation (8) as $$L_{WL}^j = N_{WL}^j \lambda_{WL} + b_{WL} + B_{WL}^j + \text{IFB}^j + \varepsilon_{WL}^j \quad (8)$$

where:
$\lambda_{WL}$ is wide-lane wavelength, about 86.4 cm for GPS and c is speed of light, $$\lambda_{WL} = \frac{c}{f_1 - f_2}; \quad (9)$$

where $N_{WL}^j$ is integer wide-lane ambiguity for satellite j, $$N_{WL}^j = N_1^j - N_2^j; \quad (1)$$

where $b_{WL}$ is wide-lane receiver bias (one per receiver and constellation for all visible satellites), which is a combination of L1 and L2 receiver code bias and phase bias, as indicated in Equation (11):

$$b_{WL} = \left(\frac{f_1}{f_1+f_2}b_{P_1} + \frac{f_2}{f_1+f_2}b_{P_1}\right) - \left(\frac{f_1}{f_1-f_2}b_{L_1} - \frac{f_2}{f_1-f_2}b_{L_2}\right), \quad (11)$$

where majority of GLONASS inter-frequency bias $b_{P_1}$ and $b_{P_2}$ in code measurement is usually assumed to be linear or a trigonometric function of the GLONASS satellite frequency number; it is not the same for all the visible satellite as with the case of CDMA signals such as GPS;

where $\text{IFB}^j$ is the inter-frequency bias for satellite j, such as for a GLONASS satellite;

where $B_{WL}^j$ is wide-lane satellite j bias (one per satellite); and where $\varepsilon_{WL}^j$ is the wide lane measurement error for satellite j including white noise, multipath and remaining un-modeled errors.

With respect to the inter-frequency bias per satellite, the linear model can be approximated below for GLONASS constellation as Equation (12):

$$\text{IFB}^j \approx k \cdot n^j \quad (12)$$

where k is the IFB coefficient for receiver code bias. The IFB varies from receiver to receiver, also varies from one siting (antenna and cabling setup) to another siting. Modelled in this way, typically k is less than 0.1.

The wide-lane satellite j bias, $B_{WL}^j$ (one per satellite) is a combination of L1 and L2 satellite code bias and satellite phase bias as in Equation (13); the satellite bias is changing slowly over time; both satellite and receiver wide-lane biases are not constant over time:

$$B_{WL}^j = -\left(\frac{f_1}{f_1+f_2}B_{P_1}^j + \frac{f_2}{f_1+f_2}B_{P_2}^j\right) + \left(\frac{f_1}{f_1-f_2}B_{L_1}^j - \frac{f_2}{f_1-f_2}B_{L_2}^j\right) \quad (13)$$

where $B_{P_1}^j$ is satellite bias for satellite j of the code phase or pseudo-range signal encoded on frequency L1 ($f_1$), where $B_{P_2}^j$ is satellite bias for satellite j of the code phase or pseudo-range on frequency L2 ($f_2$), where $B_{L_1}^j$ is satellite bias for satellite j of the carrier phase on frequency L1, where $B_{L_2}^j$ is satellite bias for satellite j of the carrier code on frequency L2.

An optional zero difference filter can be used to determine undifferenced or zero-differenced (ZD) ambiguity states or float ambiguity states associated with the carrier phase measurements of the received satellite signals. The zero difference filter 38 is illustrated in dashed lines in FIG. 2 to show that the zero difference filter 38 is optional and may be included within the wide-lane filter 40 in alternate embodiments. For example, the zero-differenced ambiguity state can be determined based on correction data 32 that contains satellite bias information from a network or group of reference receivers 20.

The wide-lane filter 40 uses zero-differenced (ZD) Melbourne-Wübbena linear combination $L_{WL}^j$ in Eq. (7) as the input measurement to estimate one wide-lane floating ambiguity state $N_{WL}^j$ per visible satellite. The wide-lane satellite bias $B_{WL}^j$ can be broadcast in real-time within correction data 32 or correction signals to mobile receivers and will compensate for that term using Equation (8).

The precise positioning module 16 or wide-lane filter 40 lumps the receiver wide lane bias b into float WL ambiguity state $N_{WL}^j$. Accordingly, the ZD WL ambiguity does not hold an integer characteristic because all of the ZD WL ambiguities include the common receiver wide lane bias. However, the single differenced (SD) wide-lane ambiguities between satellites within each constellation (e.g., GPS constellation) at mobile or reference receiver are still integers and can be resolved as integers in accordance with SD equations. Further, the DD narrow-lane, the DD wide-lane ambiguities, or the DD L 1/L2 ambiguities between receivers (20, 22) and satellites are still integers and can be resolved in accordance with double difference equations formed by subtraction of two SD observations with the benefit of receiver bias cancellation. For the GLONASS constellation, the additional inter-frequency bias (IFB) state may be required in order to preserve the integer nature of the SD ambiguities.

Given that the actual ZD float ambiguity state variable is the sum of ZD integer ambiguity and receiver bias, as explained above, dynamic update for the receiver bias variance needs to be included in the process noise model for the ZD ambiguity states as shown below in Equation 14 as follows:

$$Q_{WL}(t) = Q_{WL}(t-1) + \begin{pmatrix} 1 & \cdots & 1 \\ \vdots & \ddots & \vdots \\ 1 & \cdots & 1 \end{pmatrix} q_{b_{WL}} \cdot \Delta t \quad (2)$$

where $Q_{WL}$ is the time-varying receiver bias variance for the wide-lane ambiguities, $q_{b_{WL}}$ is the process noise associated with a matrix of ones or all-ones matrix, and $\Delta t$ is the time interval between time t−1 and t.

Equation (8) will be used for wide-lane filter 40. The zero differencing wide-lane raw observation is used for the measurement update in the wide-lane filter 40. The state variables include one float wide ambiguity per visible satellite, each conceptually including the wide-lane integer ambiguity and common receiver phase bias for the respective constellation.

The wide-lane filter 40 will begin processing even before the satellite wide-lane (WL) bias correction from the correction data 32 is received or even if the satellite WL bias correction is invalid. The navigation positioning estimator 50 or the wide-lane filter 40 reduces the float wide-lane (WL) ambiguity by the satellite wide-lane bias correction when the satellite WL bias correction becomes valid (e.g., makes a transition to valid from invalid states). Likewise, the navigation positioning estimator 50 or the wide-lane filter 40 removes the satellite WL bias from the float wide-lane ambiguity (and the satellite WL bias is increased) when the satellite wide-lane bias becomes invalid (e.g., makes a transition from valid to invalid states).

In one embodiment, the navigation positioning estimator 50 or wide-lane filter 40 adjusts the float ambiguity whenever +/−2 cycle jumps of the satellite wide-lane (WL) bias are detected, which indicates a transition between valid and invalid states. The above adjustment of the satellite wide-lane bias is limited to deviations of +/−2 cycles deviations to reduce the bandwidth or resources required for data processing. As described above, the between-satellite single differencing ambiguity resolution for each constellation can be conducted, which is the equivalent of double-differencing ambiguity resolution. The satellites without a valid satellite wide-lane bias will be skipped by the ambiguity resolution process, and the covariance matrix term may be inflated by a term representing small variance such as $1^{e-4}$ cycles-squared once the corresponding ambiguity has been fixed.

As previously suggested, the wide-lane filter 40 may comprise a zero-difference (ZD) wide-lane filter, a single-difference (SD) wide-lane filter, or a double-difference (DD) wide-lane filter, or all of the foregoing filters to determine ZD WL ambiguities, SD WL ambiguities, and/or DD WL ambiguities. The single-difference wide-lane ambiguity and variance co-variance matrix for each constellation is derived from the wide-lane filter 40, such as a zero differenced wide-lane float ambiguity Kalman filter.

In one embodiment, a LAMBDA (Least-squares AMBiguity Decorrelation Adjustment) or a modified LAMBDA procedure is performed to resolve the WL ambiguities. For instance, the error minimization of the least squares equation for decorrelated ambiguities is carried out over a search region determined by variance and covariance matrix of the ambiguities; floating ambiguity estimates and associated variance co-variance matrices can be used as inputs to the LAMBDA process, where the output is integer ambiguity estimates.

After passing the ambiguity resolution validation, an integer constraint representing the single differencing of the float wide-lane ambiguities can be applied into the float ambiguity filter based on Equation (8). The fixed single differencing wide-lane ambiguities will be used for ambiguity fixing for the reference receiver 20 and the correction generation of the reference receiver 20 (e.g., virtual base station) to be used in the correction data 32 (e.g., distributed to any mobile receivers).

In one embodiment, the above WL filter 40 uses the WL equations to speed up convergence on the resolution of the WL ambiguities and to provide constraints or inputs for the narrow-lane filter 44 and narrow-lane ambiguity resolution, which can provide greater potential accuracy in position estimates because the WL carrier phase measurements are associated with more phase noise than the NL carrier phase measurements.

In one embodiment, the narrow-lane filter 44 can use the following equations described below. The refraction corrected (RC) measurement is formed with the advantage eliminating the first order of ionosphere delay error. The RC code measurements using Equation (1-2) are formed in Equation (15) as below, which is in meter-level accuracy but unbiased.

$$P_{RC}^j = \frac{f_1^2}{f_1^2 - f_2^2} P_1^j - \frac{f_2^2}{f_1^2 - f_2^2} P_2^j = \rho^j + \tau_r + b_{RC} + \tau^j + B_{RC}^j + T + \varepsilon_{P_{RC}}^j \quad (3)$$

where:
- $b_{RC}$ is the receiver refraction-corrected code bias (one per receiver and constellation for all visible CDMA satellites, such as GPS satellites) which is a refraction-corrected (RC) combination of the L1 receiver code bias and the L2 receiver code bias;
- $B_{RC}^j$ is the satellite code bias which is a refraction-corrected (RC) combination of the L1 satellite code bias and the L2 satellite code bias;
- $\varepsilon_{P_{RC}}^j$ is the refraction-corrected (RC) code measurement error for satellite j including white noise, multipath and remaining un-modeled errors; and
- the other variables or parameters have the same meaning as set forth earlier in this document.

In Equation 15, $b_{RC}$ can be lumped into the receiver clock state and can be estimated together as receiver clock nuisance parameters. For GLONASS satellites, an additional inter-channel code bias may be required to be estimated if the magnitude of the inter-channel code bias is significant. $B_{RC}^j$ can be lumped into the satellite correction $\tau^j$ when they are estimated together in satellite clock determination by the PPP network. Accordingly, for simplicity, the bias $b_{RC}$ and $B_{RC}^j$ in Equation (15) can be ignored and shown in Equation (16), $$P_{RC}^j = \frac{f_1^2}{f_1^2 - f_2^2} P_1^j - \frac{f_2^2}{f_1^2 - f_2^2} P_2^j = \rho^j + \tau_r + \tau^j + T + \varepsilon_{P_{RC}}^j \quad (16)$$

where:
- $P_{RC}^j$ is the refraction-corrected phase code (or pseudo-range) for satellite j;
- $P_1^j$ is the measured phase code or measured pseudo-range on the L1 frequency for satellite j;
- $P_2^j$ is the measured phase code or measured pseudo-range on the L2 frequency for satellite j;
- $\varepsilon_{P_{RC}}^j$ is the RC phase code measurement error for satellite j including white noise, multipath and remaining un-modeled errors; and the other variables are defined below Equation 17.

The refraction-corrected (RC) carrier phase measurement, $P_{RC}^j$ for satellite j, using Equation (3-4) is also formed in Equation (17) as below, which is in centimeter-level accurate but biased by an ambiguity term $\hat{N}_{NL}^j \lambda_{NL}$.

$$L_{RC}^j = \frac{f_1^2}{f_1^2 - f_2^2} L_1^j - \frac{f_2^2}{f_1^2 - f_2^2} L_2^j = \quad (4)$$

$$\rho^j + \tau_r + b_{NL} + \tau^j + B_{NL}^j + T + (N_{RC}^j + W^j + w)\lambda_{NL} + \varepsilon_{L_{RC}}^j$$

where:
- $f_1$ is the L1 carrier frequency and $f_2$ is the L2 carrier frequency of the received satellite signals;
- $L_1^j$ is the measured carrier phase for the L1 carrier frequency transmitted from satellite j;
- $L_2^j$ is the measured carrier phase for the L2 carrier frequency transmitted from satellite j;
- $\rho^j$ is the geometric distance between the satellite j phase center and the receiver phase center including satellite StarFire orbital correction, receiver tide displacement and earth rotation correction;
- $\tau_r$ is the receiver r clock bias or error for a given GNSS system, where one receiver clock bias is estimated for each GNSS system such as GPS, GLONASS, Galileo or Beidou constellation;
- $\tau^j$ is the satellite clock error;
- $b_{NL}^j$ is the receiver narrow-lane phase bias (one per receiver and constellation for all visible satellites),
- $B_{NL}^j$ is the satellite j narrow lane phase bias (one per satellite for all receivers), which is a RC combination of the L1 satellite phase bias and the L2 satellite phase bias;
- T is the tropospheric delay, and is divided into a dry component $T_{dry}$ and a wet component $T_{wet}$;
- $W^j$ and w are phase windup errors for both satellite j and receiver, in cycles, respectively, which can be corrected with models;
- $N_{RC}^j$ is the refraction-corrected (RC) carrier phase ambiguity term;

$\lambda_{NL} = \frac{c}{f_1 + f_2}$ is the narrow lane wavelength;

and
- $\varepsilon_{L_{RC}}^j$ is the RC phase measurement error for satellite j including white noise, multipath and remaining un-modeled errors.

In Equation 17, $b_{NL}$ is a RC combination of the L1 receiver phase bias and the L2 receiver phase bias. If the $b_{NL}$ is lumped into the floating ambiguity state, the $b_{NL}$ in Equation (17) can be ignored. However, this model implies that an individual ambiguity does not have an integer characteristic. Similar to the case of WL, single-differenced narrow ambiguities between satellites still hold the integer property.

Both satellite and receiver narrow lane biases are not constant over time. The satellite j narrow lane bias also represents the fractional part of the difference of code-based clock and integer phase-based clock. If the satellite code bias $B_{RC}^j$ is combined into the satellite clock correction, the $B_{NL}^j$ in Equation (17) will become the difference of $B_{NL}^j - B_{RC}^j$. $N_{RC}^j$ is the RC carrier phase ambiguity term in Equation (18), as below $$N_{RC}^j \lambda_{NL} = \frac{f_1^2}{f_1^2 - f_2^2} N_1^j \lambda_1 - \frac{f_2^2}{f_1^2 - f_2^2} N_2^j \lambda_2 \quad (18)$$

-continued $$= \frac{N_{NL}^j}{2}\lambda_{WL} + \frac{N_{WL}^j}{2}\lambda_{NL}$$

$$= \lambda_{NL}\left(N_1^j + \frac{f_2}{f_1 - f_2}N_{WL}^j\right)$$

$$= \lambda_{NL}\left(N_2^j + \frac{f_1}{f_1 - f_2}N_{WL}^j\right)$$

The RC carrier phase ambiguity term $N_{RC}^j \lambda_{NL}$ can be further divided into two integer ambiguity terms. There are three equivalent combination forms, as shown in Equation (18):
(1) Combination of integer WL ambiguity $N_{WL}^j$ in Equation (10) and NL ambiguity $N_{NL}^j = N_1^j + N_2^j$;
(2) Combination of integer WL ambiguity $N_{WL}^j$ and integer L1 carrier phase ambiguity $N_1^j$; and
(3) Combination of integer WL ambiguity $N_{WL}^j$ and integer L2 carrier phase ambiguity $N_2^j$ Both the WL/NL ambiguity integer $N_{WL}^j$ and $N_{NL}^j$ or L1/L2 carrier phase ambiguity integer $N_1^j$ $N_2^j$ can be resolved to improve position accuracy and reduce pull-in time. As long as the bias terms are removed from the refraction-corrected (RC) phase measurements, the high accuracy carrier phase measurement can be used to provide cm-level positioning. The narrow lane wavelength is much shorter than WL wavelength. In the case of GPS, the narrow lane wavelength is about 10.7 cm while WL wavelength is 86.4 cm. Therefore, in comparison with $N_{NL}^j$ the GPS WL ambiguity integer $N_{WL}^j$ can be resolved relatively easier. In order to recover the integer property of the RC carrier phase ambiguity term $N_{RC}^j$, the WL ambiguity integer $N_{WL}^j$ need be resolved at first.

In one embodiment, Equations (16-17) can be used for the narrow-lane filter 44. The zero differencing refraction-corrected code and phase raw observations are used for the narrow-lane filter 44 measurement update. Accordingly, in the backup data the stored narrow-lane ambiguities or stored refraction-corrected ambiguities can be used to derive the narrow-lane ambiguities. The state variables include receiver position and velocity, receiver clock offsets, residual troposphere delay and floating refraction-corrected ambiguities (which implicitly combine integer wide-lane and narrow-lane ambiguities in Equation (18) along with receiver phase bias). For GLONASS satellites, the additional inter-channel code bias per satellite may be required to be estimated if the magnitude of inter-channel code bias is significant.

In one embodiment, the troposphere zenith delay and/or horizontal gradient coefficients can be estimated after an a priori troposphere model is applied. It should be noted that the receiver clock term for this method can absorb the receiver code bias. The satellite orbit, clock and satellite narrow lane bias corrections received from correction data 32 will be applied and remaining errors are reduced to sub-centimeter level.

In an illustrative configuration, the narrow-lane filter 44 can begin processing even before the satellite narrow-lane bias corrections are received or if they are invalid. The float narrow-lane ambiguity is adjusted by the satellite narrow-lane bias when it changes state to a valid state from an invalid state. Likewise, the satellite narrow-lane bias is adjusted or removed from the float narrow-lane ambiguity when the narrow-lane bias changes state to an invalid state from a valid state. In one embodiment, the float ambiguity is adjusted whenever +/−2 cycle jumps of satellite narrow-lane bias are detected. The adjustment of the satellite nar- row-lane bias is limited to +/−2 cycles to reduce the bandwidth or resources for data processing.

In one embodiment, a Best Integer Equivariant (BIE) algorithm or a modified Best Integer Equivariant algorithm can be used to take advantage of the integer nature of the ambiguities to speed up the pull-in time and improve the overall positioning accuracy.

The observation model based on Equations (16-17) allows the estimation of the position coordinate, receiver clock offset, and floating ambiguities (each combining an integer narrow lane ambiguity with the receiver phase bias). The troposphere delay can be modeled or estimated along with other parameters. It should be noted that receiver clock term for this method can absorb the receiver code bias. The satellite orbit, clock and satellite narrow lane bias correction can be obtained from the correction data 32 are applied and the remaining errors are reduced to sub-centimeter level.

In a summary, the ambiguities can be resolved in two steps:
(1) The first step is wide-lane ambiguity resolution using the Equation (8). For example, details of wide-lane ambiguity resolution are discussed in conjunction with the wide-lane filter 40 in this document.
(2) The second step is the narrow-lane ambiguity resolution. Those are computed efficiently (e.g., on a constrained basis) by inserting the resolved integer wide-lane ambiguities into equation (18). For example, details of the narrow-lane ambiguity resolution are discussed in conjunction with the narrow-lane filter 44 in this document. This narrow lane ambiguity can be the integer ambiguity value associated with either the L1 or the L2 frequency, or the narrow lane combination of both the L1 and L2 frequencies. The effective narrow lane ambiguity wavelength is about 10.7 cm, which is independent of which of the narrow lane ambiguities is resolved. This narrow lane wavelength is easily computed for either the L1 or the L2 ambiguity using equation (18). If the narrow lane combination of both the L1 and L2 frequencies is used, the combined narrow-lane ambiguity wavelength is only one-half of the wavelength of an individual narrow-lane ambiguity. However, since the combined narrow-lane ambiguity must have the same odd-even integer characteristic as the wide lane ambiguity, the same effective wavelength (10.7 cm) results for the combined narrow-lane ambiguity and the individual narrow-lane ambiguity because of the odd-even constraint.

In one embodiment, the reference receiver 20 that resolves wide-lane ambiguities and narrow-lane ambiguities to arrive at a refraction-corrected narrow-lane ambiguity solution and associated precise position estimate can be used to form or generate correction data 32 for use by one or more rovers 22 or mobile receivers 22 in a network. At a reference receiver 20 after the narrow-lane filter 44 converges (for example, the position error is less than 10 centimeters (cm)) from reference receiver 20, raw measurement corrections, correction data 32 or aiding data 30 can be generated based on the Equation (1-4). In an illustrative configuration, the aiding data 30 can comprise one or more of the following: the converged position estimate of the reference receiver 20, residual troposphere delay, refraction-corrected ambiguities from Equation (17), fixed wide-lane ambiguities and covariance, along with raw measurement corrections. This aiding data 30 can be broadcast via wireless communications devices and/or an optional wireless communications network 36, illustrated in dashed lines, for other mobile receivers 22 nearby or within a maximum range (e.g., limited only by sharing the same general set of satellites, or substantially overlapping set of satellites, within reception range of the receivers) with respect to the reference receiver 20. The reference receiver 20 can be stationary or mobile, and still provide aiding data 30 for the method and receivers (e.g., 22) described in this disclosure. Further and conversely, after the rover or mobile receiver 22 is pulled-in, the pulled-in mobile receiver 22 can effectively transform into a reference receiver 20 that generates and transmits the aiding data 30 to other mobile receivers 22, or even to the previous reference receiver 20 that experiences a signal loss or interruption and is now attempting to converge to resolve ambiguities of the received satellite signals. Thus, reference receiver 20 and mobile receiver 22 can work collaboratively and swap their roles as virtual base station (reference receiver 20) and rover mobile receiver.

As referenced in FIG. 1B and FIG. 1D, the data processing center 118 or the correction data estimator 134 determines or provides correction data 32. The reference receiver 20 and the mobile receiver 22 apply correction data 32 to the carrier phase measurements, the code phase measurements, or both. The correction data 32 contains corrections for one or more of the following: satellite orbit corrections, clock corrections, tide corrections (e.g., solid Earth tide, ocean tide and polar tide), both receiver and satellite antenna phase center variation and offset, and both receiver and satellite phase wind-up.

In one embodiment, the estimated parameters, such as receiver position, GNSS receiver clocks and troposphere delay are required to be corrected. The code biases for both satellite and receiver in Eq. (1-2), the phase biases in Eq. (3-4) for both satellite and receiver and ionosphere delay are un-corrected. The integer ambiguities and receiver phase bias for the carrier phase measurements remain in the phase corrections. The converged position, residual troposphere delay, refraction-corrected ambiguities in Equation (17), the fixed wide-lane ambiguities in Equation (8) and their variance information are combined with the raw measurement corrections as aiding data 30 for the mobile receiver, or as components in the correction data 32 to be distributed to mobile receivers.

In one embodiment, the relative positioning module 18 comprises a real-time kinematic (RTK) filter 48 or relative position estimator. In general, the relative positioning module 18 comprises a predictive filter, such as Kalman filter or a modified Kalman filter. RTK algorithm is a reliable method for determining the relative position and ambiguity difference between two receivers, such a reference receiver 20 and a mobile receiver 22, in carrier-phase positioning in real-time (e.g., for navigation applications). The RTK algorithm or RTK-like algorithm uses the following double-difference equations for code phase and carrier phase to determine the relative position vector (e.g., baseline vector) between the reference receiver 20 and the mobile receiver 22:

$$\nabla \Delta P_1^{ij} = \nabla \Delta \rho^{ij} + \nabla \Delta I^{ij} + \nabla \Delta \varepsilon_{P_1}^{ij} \quad (19)$$

$$\nabla \Delta P_2^{j} = \nabla \Delta \rho^{j} + \frac{f_1^2}{f_2^2} \nabla \Delta I^{ij} + \nabla \Delta \varepsilon_{P_2}^{j} \quad (20)$$

$$\nabla \Delta L_1^{ij} = \nabla \Delta \rho^{ij} - \nabla \Delta I^{ij} + \Delta N_1^i \lambda_1^i - \Delta N_1^j \lambda_1^j + \nabla \Delta \varepsilon_{L_1}^{ij} \quad (21)$$

$$\nabla \Delta L_2^{ij} = \nabla \Delta \rho^{ij} - \frac{f_1^2}{f_2^2} \nabla \Delta I^{ij} + \Delta N_2^i \lambda_2^i - \Delta N_2^j \lambda_2^j + \nabla \Delta \varepsilon_{L_2}^{ij} \quad (22)$$

$\nabla \Delta L_1^{ij}$ is the double-difference L1 carrier phase measurements with respect to satellite i and j, the rover and the reference receiver;

$\nabla \Delta \rho^{ij}$ is the double-difference geometric distance between the satellite j phase center and a receiver phase center and between satellite i phase center and the receiver phase center, including satellite orbital correction, receiver tide displacement and earth rotation correction;

$\nabla \Delta I^{ij}$ is the double-difference ionosphere error for a given satellite j and satellite i;

$\Delta N_1^i \lambda_1^i$ is the single-differenced integer ambiguity for satellite i multiplied by the wavelength for the L1 carrier from satellite i;

$\Delta N_1^j \lambda_1^j$ is the single-differenced integer ambiguity for satellite j multiplied by the wavelength for the L1 carrier from satellite j;

$\nabla \Delta \varepsilon_{L_1}^{ij}$ is the double-difference phase measurement error for satellite j and satellite i including white noise, multipath and remaining un-modeled errors with respect to the L1 frequency;

$\nabla \Delta L_2^{ij}$ is the double-difference L2 carrier phase measurements with respect to satellite i and j, the rover and the reference receiver;

$\Delta N_2^i \lambda_2^i$ is the single-differenced integer ambiguity for satellite i multiplied by the wavelength for the L2 carrier from satellite i;

$\Delta N_2^j \lambda_2^j$ is the single-differenced integer ambiguity for satellite j multiplied by the wavelength for the L2 carrier from satellite j;

$\nabla \Delta \varepsilon_{L_2}^{ij}$ is the double-difference phase measurement error for satellite j and satellite i including white noise, multipath and remaining un-modeled errors with respect to the L2 frequency; and $f_1$ is the L1 carrier frequency and $f_2$ is the L2 carrier frequency of the received satellite signals.

In Equations (19-22), the receiver/satellite dependent errors, such as code phase bias (e.g., receiver code phase bias and satellite code phase bias), carrier phase bias (e.g., receiver phase bias and satellite phase bias) and clock bias (e.g., receiver clock bias and satellite clock bias), that are common between satellites and receivers and can be cancelled out by the double-differencing operation between satellites and receivers. Some ionospheric propagation delay bias cancels out in the double-difference equations. The remaining atmospheric errors including ionospheric and tropospheric delay can be ignored after the double differencing for short baseline (e.g., range of distance between zero and 30 kilometers) between the reference receiver 20 and the rover 22. However, the remaining ionosphere error is significant for long baseline and required to be estimated per satellite in the RTK engine.

Here, for the above Equations (19-22) two GNSS receivers (e.g., reference receiver 20 and rover 22) and two satellites are required for the formation of a double-difference measurement. In one embodiment in accordance with the RTK algorithm, a minimum of four double-difference equations and five satellites are required to solve for the relative position vector and the associated integer ambiguity for a three dimensional position estimates (e.g., in Cartesian coordinates, x, y, z).

The correction data 32, which includes orbit and clock corrections, are applied to both receivers (20, 22). It should be mentioned that the different GLONASS satellites have different frequency and wavelength. Accordingly, for GLONASS satellites, the receiver clock error after the double-differencing phase measurements can be cancelled, but the resulting double differencing ambiguities are not integers any more. The float ambiguity bias for each reference satellite (e.g., GLONASS satellite) is required to be estimated.

The relative positioning module 18 or an RTK algorithm can be used to estimate the double differenced integer L1/L2 ambiguities between reference receiver 20 and rover 22, remaining ionosphere delay bias per satellite, relative position $\Delta X_{RTK}=X(\text{rove})-X(\text{ref})$ between the rover position X(rove) of the mobile receiver 22 and reference position X(ref) of the reference receiver 20. X(ref) is a converged position with precise (e.g., PPP) centimeter level accuracy if the Real-time kinematic filter 48 or relative positioning module 18 in Equation (17) is already converged at the reference receiver 20.

In one embodiment, the standard LAMBDA method, the least squares method, or another ambiguity resolution technique can be applied to resolve the DD ambiguities. If the ambiguity resolution succeeds, the relative position accuracy of $\Delta X_{RTK}$ can be determined to centimeter level as well. Therefore, rover 22 precise position can be derived at centimeter level accuracy. If the DD L1/L2 ambiguities can be fixed correctly in Equations (21-22), the double difference of wide lane integer ambiguity and refraction corrected ambiguity between satellite i and j can be derived using Equations (23-24):

$$\nabla \Delta N_{WL}^{ij}(RTK) = \nabla \Delta N_1^{ij} - \nabla \Delta N_2^{ij} \qquad (23)$$

$$\nabla \Delta N_{RC}^{ij}(RTK) = \frac{f_1^2}{f_1^2 - f_2^2}\nabla \Delta N_1^{ij} - \frac{f_2^2}{f_1^2 - f_2^2}\nabla \Delta N_2^{ij} \qquad (24)$$

where:

$\nabla \Delta_{WL}^{ij}(RTK)$ is the RTK double-difference wide-lane ambiguity for satellites i and j with respect to the reference receiver 20 and the rover 22;

$\nabla \Delta N_1^{ij}$ is the double-difference L1 wide-lane ambiguity for satellites i and j with respect to the reference receiver 20 and the rover 22;

$\nabla \Delta N_2^{ij}$ is the double-difference L2 wide-lane ambiguity for satellites i and j with respect to the reference receiver 20 and the rover;

$f_1$ is the frequency of the L1 carrier phase signal and $f_2$ is the frequency of the L2 carrier phase signal; and $\nabla \Delta N_{RC}^{ij}(RTK)$ is the RTK refraction-corrected double-difference float ambiguity (e.g., wide-lane or narrow-lane) for satellites i and j with respect to the reference receiver 20 and the rover 22.

In one configuration, the recovery data includes one or more of the following: RTK DD wide-lane integer ambiguity, $\nabla \Delta N_{WL}^{ij}(RTK)$; RTK fixed refraction-corrected (RC) float ambiguity, $\nabla \Delta N_{RC}^{ij}(RTK)$; and the relative position $\Delta X$ (e.g., relative position vector between the reference receiver 20 and the rover 22); and the variance/co-variance of the relative position $\Delta X$. The recovery data can be used as additional constraints or inputs (e.g., together with aiding data 30 and precise correction data 32) to speed up current filter convergence (e.g., wide-lane filter 40 convergence, narrow-lane filter 44 convergence, or both) process at rover 22 in the precise positioning module 16.

Figure 3:
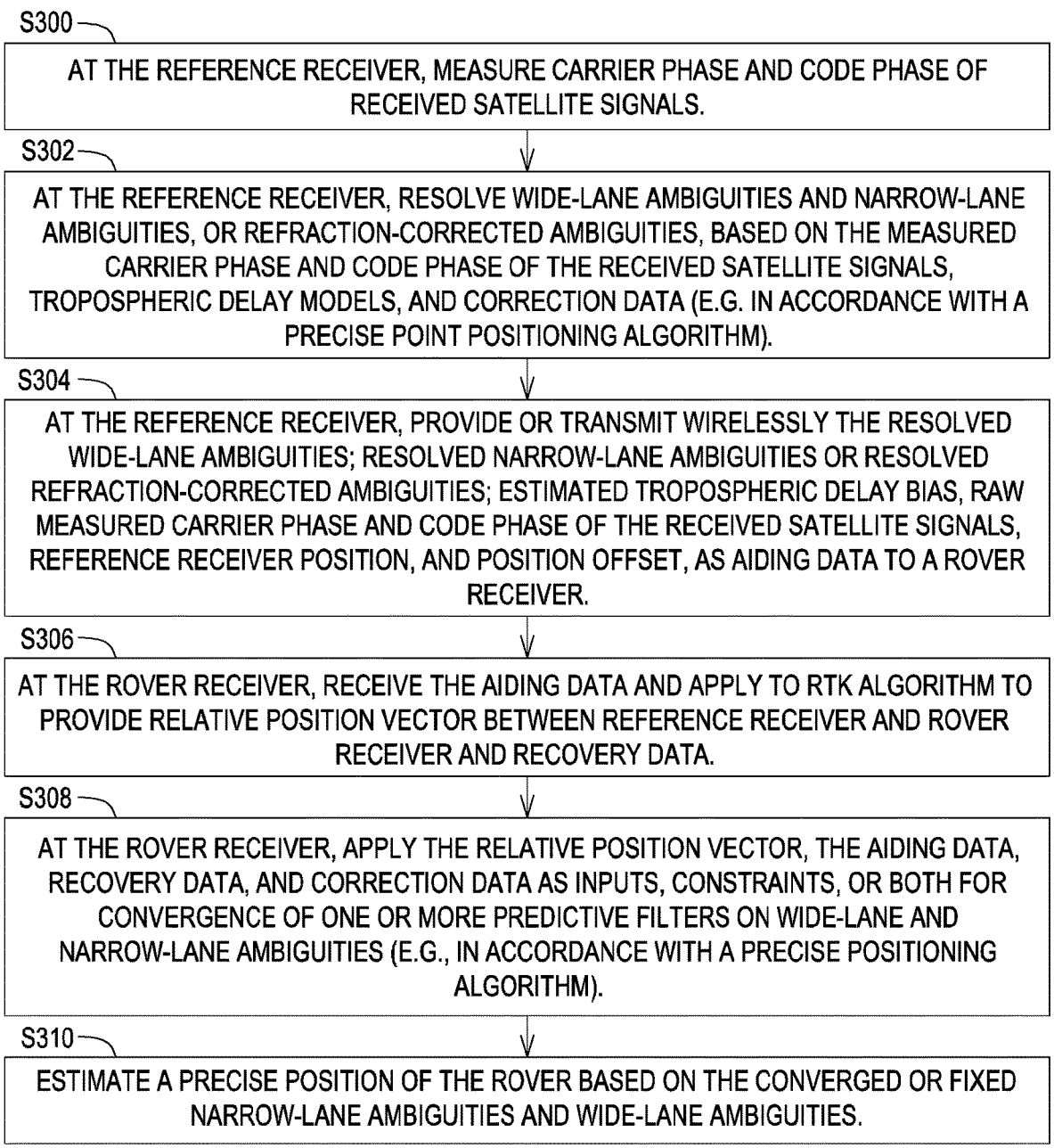
FIG. 3 illustrates one embodiment of method and satellite receiver for operating a satellite receiver for rapid determination of precise position by aiding data.

FIG. 3 illustrates one embodiment of method and satellite receiver for rapid determination of precise position by aiding data 30. The method of FIG. 3 begins in step S300.

In step S300, the reference receiver 20 or the measurement module 56 measures carrier phase and code phase of received satellite signals. For example, the carrier phase measurement module 58 measures carrier phase of the received satellite signals within view or reception range.

In step S302 at the reference receiver 20, the precise positioning module 16 or navigation positioning estimator 50 resolves wide-lane ambiguities and narrow-lane ambiguities or refraction-corrected ambiguities based on the measured carrier phase and code phase of the received satellite signals, tropospheric delay models, and correction data 32 (e.g. in accordance with a precise point positioning algorithm). For example, the reference receiver 20 can estimate wide-lane (WL) ambiguities (e.g., single-difference (SD) WL ambiguities), narrow-lane ambiguities (e.g., single difference (SD) NL ambiguities), refraction-corrected (RC) ambiguities, a reference position and residual tropospheric bias at the reference receiver 20 based on the correction data 32 (e.g., precise point position data, with precise clock and orbit data for respective satellites). In one example, consistent with the resolved ambiguities, the precise positioning module 16 or navigation positioning estimator 50 estimates a reference solution or a reference position (e.g., three dimensional coordinates), which comprises a precise point positioning reference position of the reference receiver 20 that is stationary or mobile.

In step S304 at the reference receiver 20, the precise positioning module 16 provides and supports wireless, transmission by the first wireless communications device 28 (in FIG. 1 A) or by the correction wireless device 26 (of FIG. 1D), of the following aiding data 30 to a mobile receiver 22 or rover: (1) the resolved wide-lane ambiguities; (2) estimated narrow-lane ambiguities or estimated refraction-corrected ambiguities; (3) estimated tropospheric delay bias, (4) raw measured carrier phase and code phase of the received satellite signals, (5) reference receiver position (of reference receiver 20), and (6) position offset (e.g., between RTK and PPP reference frame or between the position states in RTK filter 48 and the precise positioning module 16). In one example, the position offset or position offset vector comprises the offset vector between the precise position (e.g., precise point position, PPP solution) at the reference receiver 20 and reference coordinates, where the precise position is provided by the precise positioning module 16 over a first measurement time period and where the reference coordinates may comprise: (1) known reference coordinates of the reference receiver 20 at the first measurement time period (e.g., if the reference receiver 20 is stationary or aligned with known reference position), or (2) a corresponding RTK position by the relative positioning module 18 or the RTK filter 48 over the first measurement time period for the reference receiver 20, or (3) any offset vector from a RTK data message of any available RTK base station 177 within an acceptable range of the mobile receiver 22 and reference receiver 20 at the first measurement time period.

In step S306 at the mobile receiver or rover 22, the second wireless communications device 34 (in FIG. 1A) or the correction wireless device 26 (in FIG. 1D) receives the aiding data 30; the relative positioning module 18 or real-time-kinematic (RTK) filter 48 applies a real-time kinematic (RTK) algorithm to provide a relative position or relative position vector between reference receiver 20 and rover 22 and recovery data (e.g., associated with a resolved double-difference ambiguity between the reference receiver 20 and the rover 22 and associated with a pair of satellites). As indicated above, the recovery data includes one or more of the following: RTK double-difference (DD) wide-lane integer ambiguity, $\nabla \Delta N_{WL}^{ij}(RTK)$; RTK fixed refraction-corrected (RC) double-difference (DD) float ambiguity, $\nabla\Delta N_{RC}^{ij}$(RTK); and the relative position $\Delta X$ (e.g., relative position vector between the reference receiver 20 and the rover 22); and the variance/co-variance of the relative position $\Delta X$. Step S306 may be carried out by various techniques, which may be applied separately or cumulatively.

Under a first technique, the relative positioning module 18 uses double-difference of phase measurements between the reference receiver 20 and the rover 22 and two satellites to resolve double-difference RTK ambiguities.

Under a second technique, relative positioning module 18 or the real-time kinematic filter 48 determines a relative position or the relative position vector between a mobile receiver 22 and reference receiver 20 based on a set of real-time kinematic (RTK) algorithms to resolve the L1/L2 double-differenced (DD) fixed integer values including: the L1 double-difference (DD) wide-lane (WL) fixed integer value ($N_1$ or $\nabla\Delta N_1^{ij}$) between the reference receiver 20, mobile receiver 22 at L1 frequency and reference pair of satellites (i and j) per Global Navigation Satellite System (GNSS) system and the L2 DD WL fixed integer value ($N_2$ or $\nabla\Delta N_2^{ij}$) between the mobile receiver 22, reference receiver 20 at L2 frequency and the same reference pair of satellites (i and j) per GNSS system. For example, the second technique may use Equation 24.

Under a third technique, the data storage device 62 of the rover 22 stores or retrieves aiding data 30 provided by a reference receiver 20, where the aiding data 30 comprises a set of one or more of the following: resolved wide-lane ambiguities; estimated narrow-lane ambiguities or estimated refraction-corrected ambiguities; estimated tropospheric delay bias, raw measured carrier phase of the received satellite signals, reference receiver position (e.g., fully or substantially converged precise point position (PPP) of the reference receiver 20), and position offset (e.g., between RTK and PPP reference frame or between the position states in RTK filter 48 and the precise positioning module 16).

Under a fourth example, S306, the rover 22 can receive a data message of aiding data 30 from a reference receiver 20 or data storage 62, where the aiding data 30 comprises the estimated (e.g., pulled-in or post-convergence) wide-lane (WL) and narrow-lane (NL) ambiguities from one or more satellite carrier signals, estimated (e.g., pulled-in or post convergence) reference position or coordinates of the reference receiver 20 near the rover 22 or within a certain range of the rover or with a sufficient overlap in the observed satellites by the rover 22 and the reference receiver 20 at any given measurement time (e.g., epoch), the tropospheric delay at zenith direction including the a priori model and residual tropospheric delay estimation, and raw phase measurements of the reference receiver 20. The rover 22, or its relative positioning module 18, is adapted to estimate a relative position or relative position vector between a mobile receiver 22 and reference receiver 20 based on a set of real-time kinematic (RTK) algorithm to resolve the L1/L2 double-differenced (DD) fixed integer values ($N_1$, $N_2$) between reference: mobile receivers at carrier frequency L1 and reference satellite pair per each GNSS system (e.g., GPS or GLONASS) and between reference-mobile receivers at carrier frequency L2 and the same reference satellite pair per each GNSS system. The double differencing can be used to eliminate receiver clock bias and estimate frequency dependent bias in the carrier phase measurements. The carrier phase measurements at different carrier frequencies (e.g., L1, L2) can be used to estimate or compensate for ionospheric delay.

In step S308 at the rover 22, the precise positioning module 16 or the aided convergence module 46 applies the relative position vector, the aiding data 30, recovery data, and correction data 32 (e.g., with precise clock and orbit information on the received satellite signals) as inputs, constraints, or both for convergence of one or more predictive filters (e.g., 40, 44) on wide-lane and narrow-lane ambiguities (e.g., in accordance with a precise positioning algorithm). For example, the rover 22, its wide-lane filter 40, or its data processor 66, is adapted to compute single-difference (SD) wide-lane ambiguity (e.g., integer ambiguity) based on recovery data, such as a L1/L2 fixed, double-difference (DD) ambiguities associated with an RTK solution (e.g., resolved RTK ambiguity in step S306), and aiding data 30, such as the estimated wide-lane (WL) ambiguities (e.g., floating WL ambiguity) from the reference receiver 20, and the refraction-corrected (RC) ambiguities from the reference receiver 20. The aiding data 30 may comprise any of the following data: the resolved wide-lane (WL) ambiguities; estimated narrow-lane (NL) ambiguities or and the refraction-corrected (RC) ambiguities, raw phase measurements of the reference receiver 20, reference receiver position of the reference receiver and the position offset.

After RTK ambiguity resolution is successfully completed for the reference station and rover 22 for at least five GNSS satellites, the rover 22 can use the recovery data, aiding data 30, and correction data 32 to apply a rapid fix or rapid convergence of ambiguity resolution or precise position estimation of one or more filters (e.g., 40, 44) of the precise positioning module 16. Generically, the above process may be referred to as an aided rapid convergence process for a satellite navigation receiver. For example, in certain embodiments a satellite navigation receiver that can use the above rapid convergence process may be referred to as a StarFire Instant Fix™ satellite navigation receiver, which is a trademark of Deere & Company of Moline, Ill., U.S.A.

In one embodiment, the aided rapid convergence process includes following five steps, which apply the following constraints to the wide-lane filter 40, narrow-lane filter 44 or the precise positioning module 16 during the precise point positioning process: (1) single difference wide-lane ambiguity constraint, (2) current rover 22 position constraint, (3) troposphere bias constraints, (4) single difference refraction-corrected ambiguity constraints and (5) constraint outlier detection and adaptation. The high-level purpose of the constraints for the aided rapid convergence process is to allow for the precise positioning module 16 (e.g., seamless precise-point-position PPP estimator) to be converged instantaneously based on the recovery data (e.g., RTK results) and aiding information from reference receiver 20.

In the zero-difference filter 38 or the precise positioning module 16, the zero-difference ambiguity contains both integer ambiguity value and common receiver phase bias. The common receiver phase bias can change rapidly. The single-difference ambiguity constraint between satellites is preferred over the zero-difference ambiguity constraint because the single difference equations cancel out transmitted satellite signal phase bias and transmitted satellite clock bias, whereas receiver clock bias remains where phase measurements are provided by one receiver.

In one embodiment, the single-difference (SD) wide-lane (WL) ambiguity $\nabla N_{WL}^{ij}$(ref) from the reference receiver 20 can be fixed into integer value in the wide-lane filter 40 using the Equation (8). The SD WL ambiguity is a single difference with respect to two satellites, i and j for the reference receiver 20. The fixed DD wide-lane ambiguity $\nabla\Delta N_{WL}^{ij}$(RTK) in Eq. (23) and $\nabla N_{WL}^{ij}$(ref) can be used to recover rover 22 wide-lane SD integer ambiguity $\nabla N_{WL}^{ij}$ (rove). The SD wide-lane integer ambiguity can be computed in Equation (25) below. The integer constraint $\nabla N_{WL}^{ij}$ (rove) can then be applied into rover 22 wide-lane filter 40 in Eq. 8.

$$\nabla N_{WL}^{ij}(\text{rove}) = \nabla \Delta N_{WL}^{ij}(\text{RTK}) + \nabla N_{WL}^{ij}(\text{ref}) \quad (25)$$

In other words, the navigation positioning estimator 50, the precise positioning module 16 or the wide-lane filter 40 at the rover 22 can use the RTK double-difference wide-lane ambiguities $\nabla \Delta N_{WL}^{ij}$ (RTK) for satellites i and j (with respect to the rover 22 and the reference receiver 20) and the single-difference wide lane ambiguity, $\nabla N_{WL}^{ij}$ (ref), from the reference receiver to derive or estimate the respective single-difference ambiguities, $\nabla N_{WL}^{ij}$ (rove), at the mobile receiver or rover 22, in accordance with Equation 25.

The rover 22 precise (e.g., PPP) position X(rove) can be derived in Equation (26) from the relative position change $\Delta X_{RTK}$=X(rove)−X(ref) in the RTK solution, and RTK base position of the reference receiver 20 X(ref) from the converged precise (e.g., PPP) solution at reference, as follows:

$$X(\text{rove}) = \Delta X_{RTK} + X(\text{ref}) \quad (26)$$

where:
X (rove) is the position of the mobile receiver;
$\Delta X_{RTK}$ is a relative change in position between the mobile receiver and the reference receiver; and
X(ref) is the position of the reference receiver.

The covariance matrix $Q_{XYZ}$ (rove) for rover position of the rover 22 can be derived from the variance of reference receiver position $Q_{XYZ}$ (ref) and relative position change $Q_{\Delta XYZ(RTK)}$ of the rover 22 in RTK if they are assumed to be un-correlated as shown in Equation (27):

$$Q_{XYZ}(\text{rove}) = Q_{\Delta XYZ(RTK)} + Q_{XYZ}(\text{ref}) \quad (27)$$

$Q_{XYZ}$(rove) is the covariance matrix for the estimated position of the mobile receiver;
$Q_{\Delta XYZ}$ (RTK) is the change in the covariance matrix associated with the relative change in position $\Delta X_{RTK}$; and
$Q_{XYZ}$(ref) is the covariance matrix for the estimated position of the reference receiver.

The rover position X(rove) of the rover 22 and corresponding covariance matrix $Q_{XYZ}$ (rove) can be considered as virtual measurements or constraints to be applied to the current narrow-lane filter 44 or precise positioning module 16 of the rover 22.

The remaining troposphere delay error, after a priori modeling, can be estimated as it changes slowly over time and with traveled distance between the reference receiver 20 and rover 22. In certain configurations, the estimated troposphere delay is assumed to remain un-changed over a short period such a few minutes as Equation (28). However, the variance of estimated delay is required to be inflated by both spatial $q_{Trop}^{Spatial}$ (such as 0.1 parts per million (ppm)) and temporal correlation factors $q_{Trop}^{Temporal}$ (such as 1 centimeter (cm) per hour) in Equation (29). The Equations (28-29) below can be considered as a virtual measurement to constrain the troposphere delay estimation in the precise positioning module 16 (e.g., PPP estimator).

$$T(\text{rove}) \approx T(\text{ref}) \quad (28)$$

where:
T(rove) is the estimated tropospheric delay for the mobile receiver; and
T(ref) is the estimated tropospheric delay for the reference receiver.

$$Q_{rove} = Q_{ref} + \Delta t * q_{Trop}^{Temporal} + |\Delta X_{RTK}| * q_{Trop}^{Spatial} \quad (29)$$

where:
$Q_{rove}$ is the variance of estimated tropospheric delay of the rover or mobile receiver;
$q_{Trop}^{Spatial}$ is a spatial correlation factor for inflating the covariance over spatial displacement of the mobile receiver;
$q_{Trop}^{Temporal}$ is a temporal correlation factor for inflating the covariance over time;
$|\Delta X_{RTK}|$ is the relative distance or baseline of the mobile receiver with respect to the reference receiver, and
$\Delta t = t_2 - t_i$ or the time difference between the first measurement time and the second measurement time.

Where $|\Delta X_{RTK}|$ is baseline length or relative distance between the reference receiver 20 and rover 22 receiver. Similarly, the SD refraction-corrected ambiguity and variance for the rover 22 can be derived as shown below in Equation (30-31) based on the converged single-difference (SD) refraction-corrected (RC) ambiguity $\nabla N_{RC}^{ij}$(ref) at the reference receiver 20 between two satellites, i and j, and DD ambiguity $\nabla \Delta N_{RC}^{ij}$(RTK). The SD RC ambiguity at the rover 22 with respect to two satellites, i and j, is $\nabla N_{RC}^{ij}$ (rove) and variance $Q_{\nabla N_{RC}^{ij}}$(rove) can be computed as part of the virtual base correction from the narrow-lane filter 44 as shown in Equations (16-17).

$$\nabla N_{RC}^{ij}(t_2) = \nabla \Delta N_{RC}^{ij}(\text{RTK}) + \nabla N_{RC}^{ij}(t_1) \quad (30)$$

$$Q_{\nabla N_{RC}^{ij}}(t_2) = Q_{\nabla \Delta N_{RC}^{ij}(\text{RTK})} + Q_{\nabla N_{RC}^{ij}}(t_1) \quad (31)$$

The variance of $\nabla \Delta N_{RC}^{ij}$(RTK) is zero if both L1 and L2 ambiguity are fixed into integer values. Otherwise, where L1 or L2 ambiguity is a float solution, the variance of float $\nabla \Delta N_{RC}^{ij}$(RTK) ambiguity can derived from RTK ambiguity state variance. It should be mentioned that the constraint of float ambiguity from RTK can be applied as well.

After the constraints of single-difference (SD) wide-lane (WL) ambiguities are determined, the rover position of the rover 22, tropospheric delay bias and single-difference (SD) ambiguities are estimated by the wide-lane filter 40 and narrow-lane filter 44; the post-fit residuals of these constraints (e.g., SD WL ambiguities, other SD ambiguities, or DD ambiguities, respectively) can be computed by the navigation positioning estimator 50. The ratio of post-fit residual, or its standard deviation, divided by the square root of the variance (e.g., standard deviation) of the constraint (e.g., SD WL ambiguities, other SD ambiguities, or DD ambiguities, respectively) can be computed. If that ratio exceeds a large threshold such as three (3), the constraint should be considered problematic. The ratio exceeding the threshold could be caused by incorrect RTK ambiguity resolution output of the RTK filter 48 or the navigation positioning estimator 50, for example. The remedy for this issue of ratio exceeding the threshold or erroneous ambiguity resolution is to remove the corresponding problematic constraints one-by-one. An alternative approach is to de-weight those problematic constraint(s) by increasing their variance, using the ratio as a scaling factor, for example. Typically, the error checking or error resolution is done in an iterative way.

In step S310 at the rover 22, the precise positioning module 16 or the navigation positioning estimator 50 estimates a precise position of the rover 22 based on the converged or fixed narrow-lane ambiguities (or refraction corrected ambiguities) and wide-lane ambiguities (e.g., with the benefit of aiding data, recovery data (e.g., relative position data, RTK data, or data derived from the aiding data and observables) and correction data). The mobile receiver or the positioning engine can compute an absolute position of the mobile receiver based on the relative position and a reference absolute position of the reference receiver 20 (in the received data message including coordinates of the reference receiver 20 and/or a position offset (e.g., of stationary reference receiver 20 from known position or known coordinates). The rover 22, precise positioning module 16 or navigation positioning estimator 50 can estimate a precise position (e.g., precise point position, PPP or a fully converged precise position) of the mobile receiver based on aiding data, such as the converged or fixed narrow-lane ambiguities and wide-lane ambiguities further comprises estimating wide-lane (WL) ambiguities; refraction-corrected (RC) ambiguities or narrow-lane ambiguities, mobile tropospheric bias for the mobile receiver, reference receiver position, and position offset. Further, the precise positioning module 16 or navigation positioning estimator 50 may ignore, discount or disregard ambiguities and associated respective phase measurements or satellite signals that are deemed to be unreliable by a variance or standard deviation ratio test. The above steps of FIG. 3 are executable or implemented by a data processor 66 of an electronic data processing system 152 of the mobile receiver.

Figure 4A:
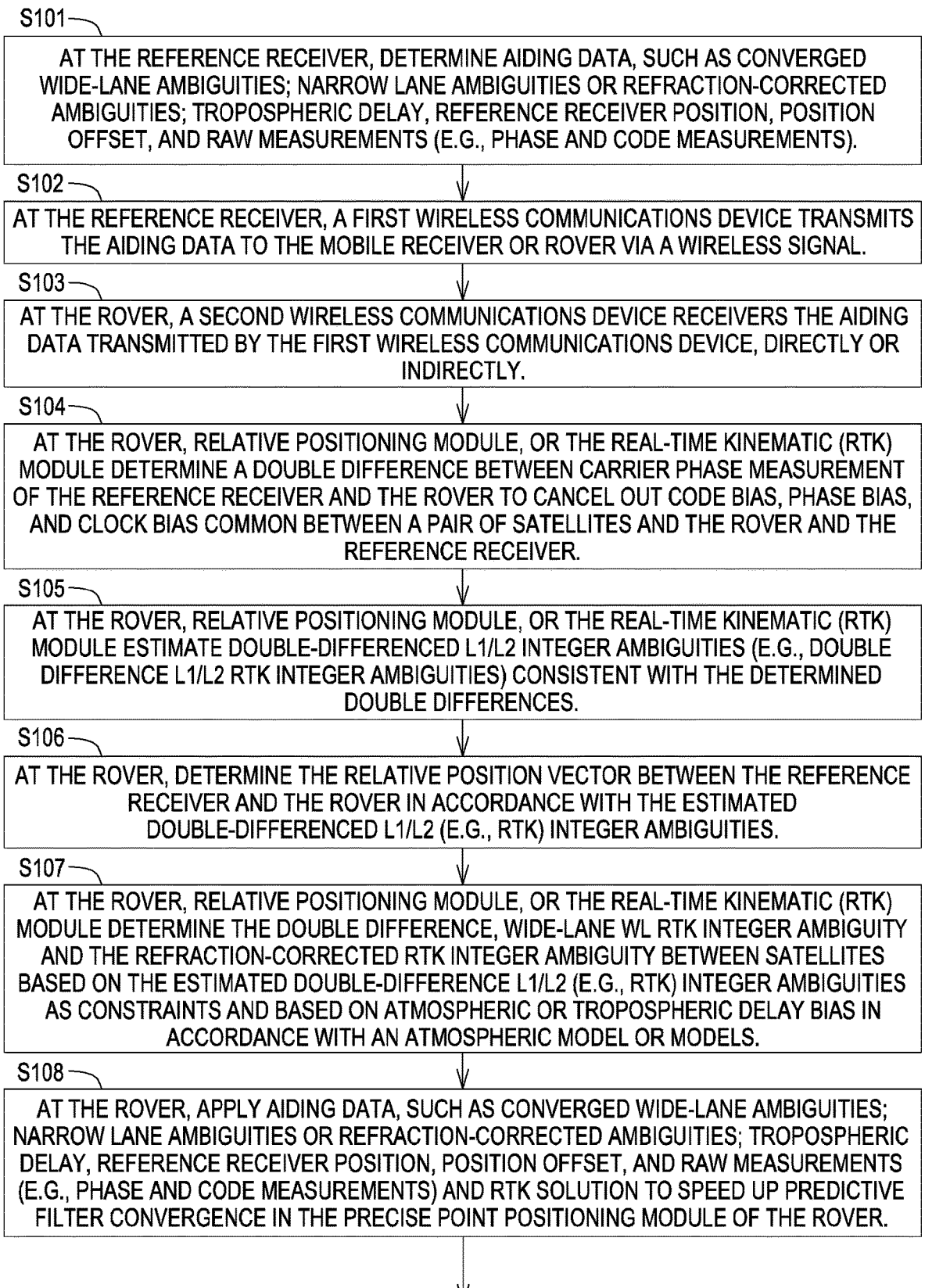
FIG. 4 illustrates another embodiment of method for operating a satellite receiver for rapid determination of precise position by aiding data.

In accordance with one embodiment, FIG. 4 discloses a method and satellite receiver for rapid determination of precise position by aiding data 30. The method of FIG. 4 begins in step S101.

In step S101, a reference receiver 20, a data processor 66 or the precise positioning module 16 (e.g., precise point positioning module) determines aiding data 30, such as converged wide-lane ambiguities; narrow lane ambiguities or refraction-corrected ambiguities, tropospheric delay, reference receive position and raw measurements (e.g., phase and code measurements). For example, the reference receiver 20 or the precise positioning module 16 determines the aiding data 30 for a set of received carrier phase signals, received code signals, or both from a set of satellites of one or more GNSS systems (e.g., GPS, GLONASS, and/or Galileo) in accordance with precise point positioning algorithm. First, the precise positioning module 16 may estimate undifferenced or zero-differenced wide-lane ambiguities. Second, the precise positioning module 16 can estimate single-differenced wide-lane (WL) ambiguities. Third, the precise positioning module 16 can use the estimated wide-lane ambiguities as constraints or inputs for estimating the narrow-lane ambiguities or refraction-corrected ambiguities. For instance, at the reference receiver 20, estimating of wide-lane (WL) ambiguities, by a predictive filter, is based on a LAMBDA (Least-squares AMBiguity Decorrelation Adjustment) or modified LAMBDA procedure to prepare for determination of the narrow-lane ambiguities in integer form (e.g., in accordance with a Best Integer Equivariant (BIE) algorithm or modified BIE algorithm). The BIE is a ambiguity resolution or ambiguity fixing technique that can minimize the mean squared error of the integer ambiguities or the real part of the floating solution.

In step S102, at the reference receiver 20, a first wireless communications device 28 (in FIG. 1A) transmits the aiding data 30 to the mobile receiver or rover 22 via a wireless signal.

Alternately, in step S102, at the reference receiver 20, a correction wireless device 26 (in FIG. 1D) transmits aiding data 30 to the correction device 26 at the rover 22 either directly or via one or more wireless communication systems 136. Further, the same correction wireless device 26 can be used to broadcast correction data 32 from the data processing center 118 to both the reference receiver 20 and the rover 22.

In step S103, at the rover 22, a second wireless communications device 34 (in FIG. 1A) receives the aiding data 30 transmitted by the first wireless communications device 28 (in FIG. 1A), directly or indirectly. For example, the first wireless communications device 28 and the second wireless communications device 34 may comprise transceivers that communicate over a wireless communications network 36, such as cellular system, trunking system, a repeater, or a satellite communications system.

Alternately, in step S103, at the rover 22, a correction wireless device 26 (in FIG. 1D) receives the aiding data 30 transmitted by the correction wireless device 26 (in FIG. 1D) of the reference receiver 20.

In step S104, at the rover 22, the relative positioning module 18, or the real-time kinematic (RTK) module determine a double difference between carrier phase measurements of the reference receiver 20 and the rover 22 to cancel out code bias, phase bias, and clock bias common between a pair of satellites and the rover 22 and the reference receiver 20.

In step 105, at the rover 22, relative positioning module 18, or the real-time kinematic (RTK) module estimate double-differenced L1/L2 integer ambiguities (e.g., double difference L1/L2 RTK integer ambiguities) consistent with the determined double differences. In this document, double-differenced L1/L2 integer ambiguities or real-time kinematic (RTK) double-differenced L1/L2 ambiguities means any of the following: DD L1 RTK integer ambiguities, DD L2 RTK integer ambiguities or both. Step S105 may be carried out in accordance with various techniques, which may be applied separately and cumulatively.

Under a first technique, the rover 22, relative positioning module 18 or real-time kinematic (RTK) module estimates double-differenced L1/L2 integer ambiguities, such as DD L1 RTK integer ambiguities, DD L2 RTK integer ambiguities or both, by minimizing the error associated with a least squares equation to search for optimal or acceptable integer ambiguity solutions among candidate integer ambiguity solutions.

Under a second technique, the rover 22, relative positioning module 18 or real-time kinematic (RTK) module estimates double-differenced L1/L2 integer ambiguities by a LAMBDA (Least-squares AMBiguity Decorrelation Adjustment) or modified LAMBDA method. For instance, the error minimization of the least squares equation for decorrelated ambiguities is carried out over a search region determined by variance and covariance matrix of the ambiguities; floating ambiguity estimates and associated variance co-variance matrices can be used as inputs to the LAMBDA process, where the output is integer ambiguity estimates.

Under a third technique, the rover 22, relative positioning module 18 or real-time kinematic (RTK) module estimates double-differenced L1/L2 integer ambiguities and ionosphere delay bias per satellite.

In step S106, at the rover 22, the relative positioning module 18 or the real-time kinematic (RTK) module determine the relative position vector between the reference receiver 20 and the rover 22 in accordance with the estimated double-differenced L1/L2 (e.g., RTK) integer ambiguities. For example, the double-differenced L1/L2 integer ambiguities can be resolved in accordance with Equations 21 and 22, such as by subtracting two SD L1 ambiguities for a pair of satellites and subtracting two SD L2 ambiguities for the same pair of satellites. In practice, the relative positioning module 18 can also use the pseudo-range equations (Equations 19 and 20) as constraints to resolve the SD L1 (e.g., RTK) integer ambiguities and SD L2 (e.g., RTK) integer ambiguities.

In step S107, at the rover 22, the navigation positioning estimator 50, the relative positioning module 18 or the real-time kinematic (RTK) module determine the double difference, wide-lane WL RTK integer ambiguity and the refraction-corrected RTK integer ambiguity (or narrow-lane ambiguities) between satellites (e.g., in reception range of the rover 22 and reference receiver 20 or with overlapping sets of satellites within reception range of the rover 22 and the reference receiver 20) based on the estimated double-difference L1/L2 (e.g., RTK) integer ambiguities as constraints and based on atmospheric or tropospheric delay bias in accordance with atmospheric models.

In step S108, at the rover 22, its data processor 66 or its precise point positioning module 16 applies recovery data (e.g., RTK solution) and aiding data 30, such as converged wide-lane ambiguities, narrow lane ambiguities; refraction-corrected ambiguities or narrow-lane ambiguities; tropospheric delay, reference receiver position, position offset, and raw measurements (e.g., phase and code measurements) to speed up predictive filter convergence in the precise point positioning module of the rover 22. Step S108 may be carried out in accordance with various techniques, which may be applied separately or cumulatively.

Under a first technique, in step S108, a rover 22, its data processor 66 or its precise point positioning module 16 (e.g., aided convergence module 46) applies aiding data 30, such as the resolved double difference wide lane ambiguities (e.g., from step S105), the estimated refraction-corrected RTK integer ambiguities or narrow-lane ambiguities (e.g., from step S107), the relative position vector or relative position (e.g., from step S106) to be used as constraint data for one or more predictive filters (e.g., wide-lane filter 40, narrow-lane filter 44) associated with the precise point positioning module 16.

Under a second technique for carrying out step S108, a rover 22, its data processor 66 or its precise point positioning module 16 applies aiding data 30, such as variance and covariance of the ambiguities as constraint data for one or more predictive filters (e.g., wide-lane filter 40, narrow-lane filter 44) associated with the precise point positioning module. For example, the navigation positioning estimator 50 or precise positioning module 16 can use the variance to determine standard deviation of the resolved ambiguities or standard deviation of the position estimates to measure the quality of the resolved ambiguities and position estimates. Further, the navigation positioning estimator 50 can use the variance or determined standard deviations decide whether to eliminate or reduce weighting of certain less reliable (or more variable) carrier phase measurements from certain satellites from the final position estimate or solution.

In step S109, at the rover 22, its data processor 66 or its precise point positioning module 16 (e.g., aided convergence module 46) determines or recovers a rover wide-lane single-differenced (SD) ambiguity of the rover 22 based on one or more of the following: (1) single-difference wide-lane integer ambiguity fixed or resolved at the reference receiver 20 (e.g., in step S101) or other aiding data, and (2) resolved or fixed double-difference (DD) wide-lane ambiguity (e.g., RTK) (e.g., from step S107) or other recovery data.

In step S110, at the rover 22, its data processor 66 or its precise positioning module 16 (e.g., aided convergence module 46) determines: (1) a variance and covariance matrix for relative position of rover 22 to use as constraint data for one or more predictive filters, such as the narrow lane predictive filter associated with the precise point positioning module, (2) a single-difference narrow lane ambiguity based on the single difference wide-lane integer ambiguity (e.g., of step S109), or based on the combination of the variance and covariance matrix for relative position and the single difference wide-lane integer ambiguity (e.g., of step S109). For example, the navigation positioning estimator 50 or precise positioning module 16 can use the variance to determine standard deviation of the resolved ambiguities or standard deviation of the position estimates to measure the quality of the resolved ambiguities and position estimates. Further, the navigation positioning estimator 50 can use the variance or determined standard deviations decide whether to eliminate or reduce weighting of certain less reliable (or more variable) carrier phase measurements from certain satellites from the final position estimate or solution. Step S110 is optional as indicated by the dashed lines.

In step S111, at the rover 22, its data processor 66 or its precise positioning module 16 (e.g., aided convergence module 46) may determine an estimated rover position or rover solution based on resolution of the narrow lane ambiguities (or refraction corrected ambiguities) associated with the received carrier phase signals at the rover 22.

In step S112, at the rover 22, its data processor 66 or its precise positioning module 16 (e.g., aided convergence module 46) may determine refraction-corrected, single-difference ambiguities for the rover 22 based on the converged refraction-corrected ambiguities (e.g., from step S101) at the reference receiver 20 (or the estimated narrow-lane ambiguities) and the refraction-corrected double-difference ambiguities (RTK) (e.g., of step S107). For example, the tropospheric delay bias is required for estimation of the refraction-corrected ambiguities (e.g., in accordance with Equation 17); the tropospheric delay bias of the reference receiver 20 approximately equals (e.g., with a tolerance plus or minus five percent) the tropospheric bias of the rover 22, where the reference receiver 20 and the rover 22 are separated by a maximum distance from each other and consider relative altitude differences between the reference receiver 20 and the rover 22.

Figure 4B:
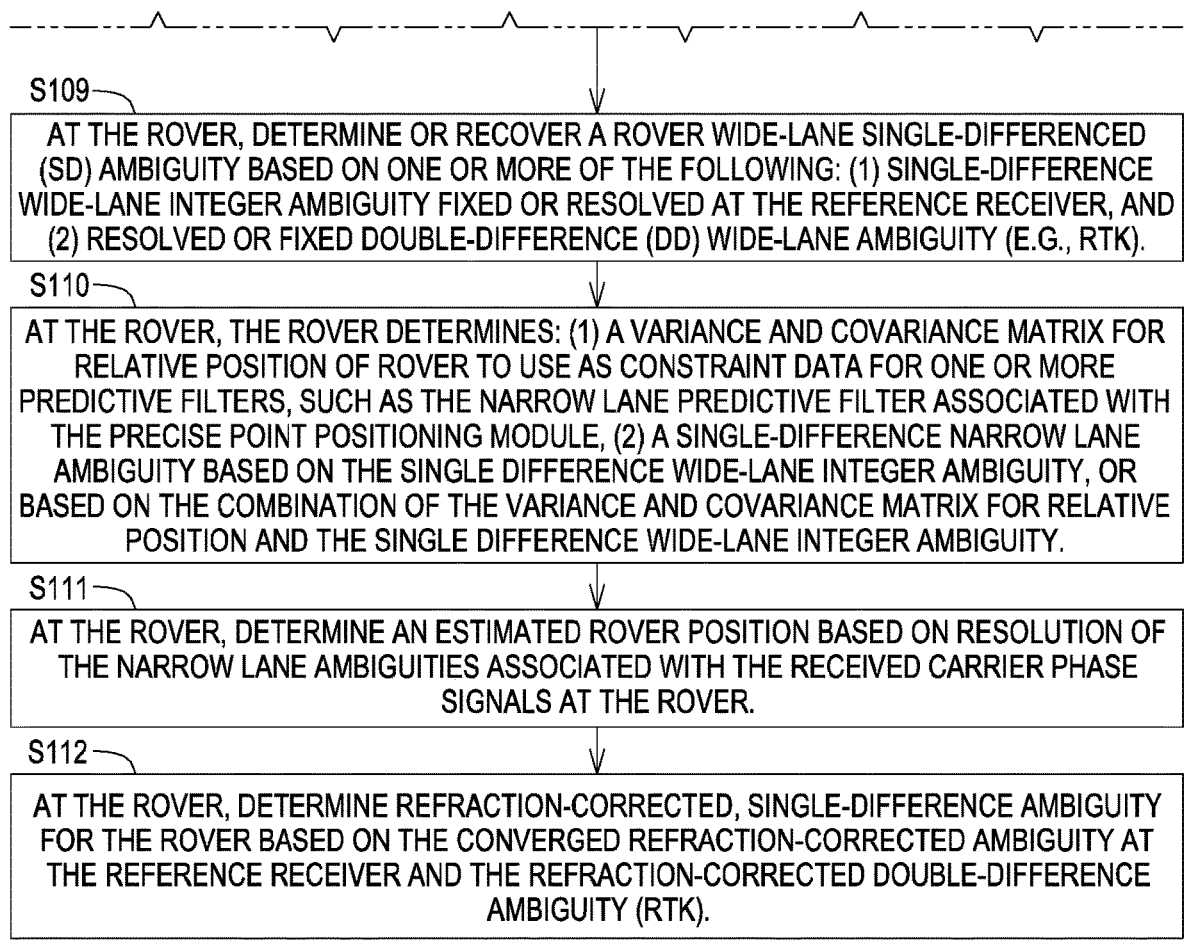
Figure 5:
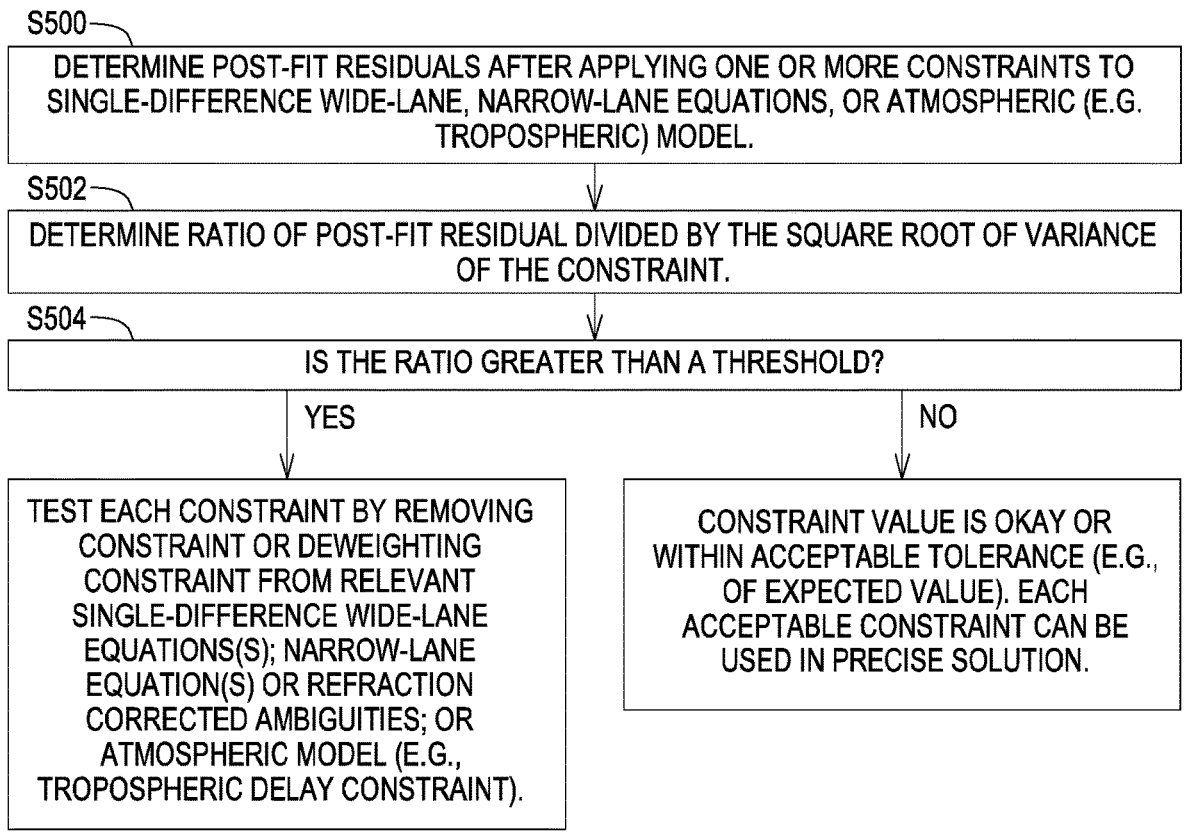
FIG. 5 illustrates one embodiment of method for operating a satellite receiver for rapid determination of precise position by aiding data.

FIG. 5 illustrates an optional error checking procedure or method that may be implemented in conjunction with the method of FIG. 3, such as after an iteration of the method, or after step S112, or as part of step S110 in FIG. 4B.

In step S500, the navigation positioning estimator 50, the precise positioning module 16, or an error detection module therein, determines post-fit residuals (for the SD WL ambiguities or SD NL ambiguities, respectively) after applying one or more constraints (SD WL ambiguities or SD NL ambiguities, respectively) to single-difference wide-lane, narrow-lane equations, or atmospheric (e.g. tropospheric) model.

In step S502, the navigation positioning estimator 50, the precise positioning module 16 or the error detection module determines ratio of post-fit residual, or its standard deviation, (for the SD WL ambiguities or SD NL ambiguities, respectively) divided by the square root of variance (i.e., standard deviation) of the constraint (SD WL ambiguities or SD NL ambiguities, respectively). The square root of the variance is also referred to as the standard deviation of a variable (e.g., for a normal distribution).

In step S504, the navigation positioning estimator 50, the precise positioning module 16 or the error detection module determines whether or not the ratio greater than a threshold. The threshold may comprise an integer (e.g., 2 or 3) or a real-valued number that is based on empirical data, field testing, a service level for the correction data or the particular mobile receiver 20, or derived from equations that depend upon the current location or geographic zone of a mobile receiver 20. If the navigation positioning estimator 50, the precise positioning module 16 or the error detection module determines that the ratio is greater than the threshold, then the method continues with step S506. However, if the navigation positioning estimator 50, the precise positioning module 16 or the error detection module determines that the ratio is not greater than the threshold (or is equal to the threshold), then the method continues with step S508.

In step S506, the precise positioning module 16 or its components test each constraint (e.g., any ambiguities such as SD, WL, NL, RC ambiguities) by removing the constraint or de-weighting the constraint from relevant single-difference wide-lane equations; narrow-lane equation(s) or refraction-corrected equations; or atmospheric models (e.g., tropospheric delay constraints). For example, the precise positioning module 16 or the navigation positioning estimator 50 may eliminate, ignore, discount or reduce the weighting of carrier phase measurements that are determined to be unreliable to arrive at the estimated rover position or solution in any of the methods or procedures set forth in this document.

In step S508, the precise positioning module 16 or its components determine that the constraint value is okay or within an acceptable tolerance (e.g., of expected value or error minimization process). For example, the precise positioning module 16 or the navigation positioning estimator 50 may include or maintain the weighting of carrier phase measurements that are determined to be unreliable to arrive at the estimated rover position or solution in any of the methods or procedures set forth in this document.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The following is claimed:

1. A method for determining a precise position of a mobile receiver, the method comprising the following steps:
   measuring carrier phase of respective ones of a plurality of received satellite signals of at least five satellites, the measured carrier phase comprising rover carrier phase measurements observed at the mobile receiver;
   at a wireless device in communication with the mobile receiver, receiving aiding data and correction data, the aiding data provided by a reference receiver for storage in a data storage device associated with the mobile receiver, the aiding data comprising reference carrier phase measurements, observed at the reference receiver, and one or more of the following: aiding resolved wide-lane ambiguities of the reference receiver, aiding determined narrow-lane ambiguities of the reference receiver, aiding estimated tropospheric delay bias of the reference receiver, pseudorange of the received satellite signals observed at the reference receiver, and reference receiver position, wherein the reference carrier phase measurements comprise raw measured carrier phase;
   applying a real-time kinematic (RTK) filter to said carrier phase measurements to provide a relative position vector between the reference receiver and the mobile receiver and to provide recovery data comprising a plurality of fixed or resolved double-difference (DD) ambiguities of said carrier phase measurements, and where said carrier phase measurements refer to the reference carrier phase measurements and the rover carrier phase measurements;
   applying the relative position vector, the aiding data, the recovery data from the RTK filter, and correction data as inputs to one or more predictive filters, of the mobile receiver, for resolving a plurality of wide-lane and narrow-lane ambiguities in accordance with a precise positioning algorithm to facilitate convergence of the one or more predictive filters on floating or converged state of the narrow-lane ambiguities and wide-lane ambiguities in said carrier phase measurements, where the narrow-lane ambiguities are determined under constraints of the inputs, the correction data comprising precise clock and orbit information on the received satellite signals; and
   estimating a precise position of the mobile receiver based on the resolved wide-lane ambiguities and the determined narrow-lane ambiguities, of said carrier phase measurements, that are in a converged state of the one or more predictive filters of the mobile receiver, where the above steps are executable by a data processor of an electronic data processing system of the mobile receiver.

2. The method according to claim 1 wherein the reference receiver is stationary or mobile, wherein the reference receiver position comprises a precise point positioning reference position of the reference receiver, and wherein the recovery data includes one or more of the following: RTK double-difference (DD) wide-lane integer ambiguity, $\nabla\Delta N_{WL}^{ij}$ (RTK); RTK fixed refraction-corrected (RC) double-difference (DD) float ambiguity, $\nabla\Delta N_{RC}^{ij}$ (RTK); a relative position between the reference receiver and the mobile receiver; a variance of the relative position; and a co-variance of the relative position.

3. The method according to claim 1 wherein the aiding data further comprises one or more of the following estimated at the reference receiver: position difference between precise point positioning reference position and reference fixed coordinate, and estimated tropospheric delay at zenith direction.

4. The method according to claim 1 wherein the recovery data of the plurality of fixed or resolved double-difference (DD) ambiguities comprises resolved L1/L2 double-difference (DD) ambiguities from the RTK filter at the mobile receiver based on raw measured carrier phase at the mobile receiver and the reference receiver for a respective pair of satellites, where L1/L2 refers to an L1 carrier phase signal for a respective satellite, or an L2 carrier phase signal for the respective satellite, or both L1 carrier phase signal and L2 carrier phase signal for the respective satellite.

5. The method according to claim 1 wherein applying the real-time kinematic (RTK) filter further comprises:
   estimating, by the RTK filter, a relative position of the mobile receiver or the relative position vector between the mobile receiver and the reference receiver based on a set of real-time kinematic (RTK) algorithms to resolve the plurality of fixed or resolved double-difference (DD) ambiguities comprising a plurality of L1/L2 double-differenced (DD) fixed integer values ($N_1$, $N_2$) between the reference receiver, mobile receiver and a reference satellite (per Global Navigation Satellite System (GNSS) system) at an L1 carrier phase signal and between the reference receiver, the mobile receiver and the same reference satellite (per GNSS system) at an L2 carrier phase signal, where L1/L2 refers to an L1 carrier phase signal for a respective satellite, or an L2 carrier phase signal for the respective satellite, or both L1 carrier phase signal and L2 carrier phase signal for the respective satellite.

6. The method according to claim 1 wherein the resolved wide-lane ambiguities comprise pulled-in or converged wide-lane ambiguities and wherein the determined narrow-lane ambiguities comprise pulled-in or converged narrow-lane ambiguities from one or more Global Navigation Satellite System (GNSS) satellites' carrier signals at the reference receiver.

7. The method according to claim 1 wherein estimating a precise position of the mobile receiver based on the determined narrow-lane ambiguities and resolved wide-lane ambiguities further comprises estimating wide-lane (WL) ambiguities to the converged state, refraction-corrected (RC) ambiguities to the converged state, and mobile tropospheric bias for the mobile receiver.

8. The method according to claim 1 further comprising: at the reference receiver, estimating of the aiding resolved wide-lane (WL) ambiguities in said carrier phase measurements, by a predictive filter or wide-lane filter, based on a LAMBDA procedure to prepare for determination of the narrow-lane ambiguities in integer form.

9. The method according to claim 1 wherein further comprising:
verifying, by the real-time kinematic (RTK) filter, a range between the reference receiver and the mobile receiver equals zero to thirty kilometers prior to the applying of the real-time kinematic (RTK) filter to resolve ambiguities associated with double-differencing of the carrier phase measurements; and
providing, by a correction wireless device, a wireless or radio communications channel between the reference receiver and the mobile receiver for receiving the correction data at the wireless device in communication with the mobile receiver.

10. The method according to claim 1 wherein, at the reference receiver for wireless communication to the mobile receiver, refraction-corrected ambiguities, ($N_{RC}$) for satellite j are determined in accordance with the following equation after resolving the narrow-lane ambiguities:

$$L_{RC}^j = \frac{f_1^2}{f_1^2 - f_2^2} L_1^j - \frac{f_2^2}{f_1^2 - f_2^2} L_2^j =$$

$$\rho^j + \tau_r + b_{NL} + \tau^j + B_{NL}^j + T + (N_{RC}^j + W^j + w)\lambda_{NL} + \varepsilon_{L_{RC}}^j$$

where:
$f_1$ is the L1 carrier frequency and $f_2$ is the L2 carrier frequency of the received satellite signals;
$L_1^j$ is the measured carrier phase for the L1 carrier frequency transmitted from satellite j;
$L_2^j$ is the measured carrier phase for the L2 carrier frequency transmitted from satellite j;
$\rho^j$ is the geometric distance between the satellite j phase center and the receiver phase center including satellite orbital correction, receiver tide displacement and earth rotation correction;

$\tau_r$ is the receiver r clock bias or error for a given GNSS system;
$\tau^j$ is the satellite clock error;
$b_{NL}$ is the receiver narrow-lane phase bias (one per receiver and constellation for all visible satellites),
$B_{NL}^j$ is the satellite j narrow lane phase bias (one per satellite for all receivers), which is a RC combination of the L1 satellite phase bias and the L2 satellite phase bias;
T is the tropospheric delay, and is divided into a dry component $T_{dry}$ and a wet component $T_{wet}$;
$W^j$ and w are phase windup errors for both satellite j and receiver, in cycles, respectively, which can be corrected with models;
$N_{RC}^j$ is the refraction-corrected (RC) carrier phase ambiguity term;

$\lambda_{NL} = \frac{c}{f_1 + f_2}$ is the narrow lane wavelength;

and
$\varepsilon_{L_{RC}}^j$ is the RC phase measurement error for satellite j including white noise, multipath and remaining un-modeled errors.

11. The method according to claim 1 wherein the plurality of fixed or resolved double-difference (DD) ambiguities comprises a plurality of resolved double-differenced (DD) L1/L2 integer ambiguities that are determined in accordance with the following equations at the mobile receiver in accordance with measurements provided from the reference receiver:

$$\nabla \Delta L_1^{ij} = \nabla \Delta \rho^{ij} - \nabla \Delta I^{ij} + \Delta N_1^i \lambda_1^i - \Delta N_1^j \lambda_1^j + \nabla \Delta \varepsilon_{L_1}^{ij}$$

$$\nabla \Delta L_2^{ij} = \nabla \Delta \rho^{ij} - \frac{f_1^2}{f_2^2} \nabla \Delta I^{ij} + \Delta N_2^i \lambda_2^i - \Delta N_2^j \lambda_2^j + \nabla \Delta \varepsilon_{L_2}^{ij}$$

where:
$\nabla \Delta L_1^{ij}$ is the double-difference L1 carrier phase measurements with respect to satellite i and j, the mobile receiver and the reference receiver;
$\nabla \Delta \rho^{ij}$ is the double-difference geometric distance between the satellite j phase center and a receiver phase center and between satellite i phase center and the receiver phase center, including satellite orbital correction, receiver tide displacement and earth rotation correction;
$\nabla \Delta I^{ij}$ is the double-difference ionosphere error for a given satellite j and satellite i;
$\Delta N_1^i \lambda_1^i$ is the single-differenced integer ambiguity for satellite i multiplied by the wavelength for the L1 carrier from satellite i;
$\Delta N_1^j \lambda_1^j$ is the single-differenced integer ambiguity for satellite j multiplied by the wavelength for the L1 carrier from satellite j;
$\nabla \Delta \varepsilon_{L_1}^{ij}$ is the double-difference phase measurement error for satellite j and satellite i including white noise, multipath and remaining un-modeled errors with respect to the L1 frequency;
$\nabla \Delta L_2^{ij}$ is the double-difference L2 carrier phase measurements with respect to satellite i and j, the mobile receiver and the reference receiver;

$\Delta N_2^i \lambda_2^i$ is the single-differenced integer ambiguity for satellite i multiplied by the wavelength for the L2 carrier from satellite i;

$\Delta N_2^j \lambda_2^j$ is the single-differenced integer ambiguity for satellite j multiplied by the wavelength for the L2 carrier from satellite j;

$\nabla \Delta \varepsilon_{L_2}^{ij}$ is the double-difference phase measurement error for satellite j and satellite i including white noise, multipath and remaining un-modeled errors with respect to the L2 frequency; and $f_1$ is the L1 carrier frequency and $f_2$ is the L2 carrier frequency of the received satellite signals;

where L1/L2 refers to an L1 carrier phase signal for a respective satellite, or an L2 carrier phase signal for the respective satellite, or both L1 carrier phase signal and L2 carrier phase signal for the respective satellite.

12. The method according claim 11 wherein after resolution of the single-differenced integer ambiguities for the L1 and L2 carrier frequencies or related double-difference ambiguities based on a difference of the single differenced integer ambiguities, RTK wide-lane ambiguities are determined in accordance with the following equation at the mobile receiver in accordance with measurements provided from the reference receiver:

$$\nabla \Delta N_{WL}^{ij}(RTK) = \nabla \Delta N_1^{ij} - \nabla \Delta N_2^{ij}$$

where:

$\nabla \Delta N_{WL}^{ij}$ (RTK) is the RTK double-difference wide-lane ambiguity for satellites i and j with respect to the reference receiver and the mobile receiver;

$\nabla \Delta N_1^{ij}$ is the double-difference L1 wide-lane ambiguity for satellites i and j with respect to the reference receiver and the mobile receiver; and $\nabla \Delta N_2^{ij}$ is the double-difference L2 wide-lane ambiguity for satellites i and j with respect to the reference receiver and the mobile receiver.

13. The method according to claim 1 wherein the aiding data provided by the reference receiver further comprises refraction-corrected ambiguity between satellite i and j derived in accordance with the following equation:

$$\nabla \Delta N_{RC}^{ij}(RTK) = \frac{f_1^2}{f_1^2 - f_2^2} \nabla \Delta N_1^{ij} - \frac{f_2^2}{f_1^2 - f_2^2} \nabla \Delta N_2^{ij}$$

where:

$\nabla \Delta N_{RC}^{ij}$ (RTK) is the RTK refraction-corrected double-difference wide-lane ambiguity for satellites i and j with respect to the reference receiver and the mobile receiver;

$\nabla \Delta N_1^{ij}$ is the double-difference L1 wide-lane ambiguity for satellites i and j with respect to the reference receiver and the mobile receiver;

$\nabla \Delta N_2^{ij}$ is the double-difference L2 wide-lane ambiguity for satellites i and j with respect to the reference receiver and the mobile receiver; and $f_1$ is the frequency of the L1 carrier phase signal and $f_2$ is the frequency of the L2 carrier phase signal.

14. The method according to claim 1 wherein the estimating of the precise position uses, as additional constraints, the recovery data comprising a double-difference (DD) wide-lane integer ambiguity, a fixed refraction-corrected float ambiguity, a relative position $\Delta X$ and their variance and co-variance where the additional constraints speed up a filter convergence process of the one or more predictive filters at the mobile receiver.

15. The method according to claim 1 further comprising:

at the mobile receiver, using a plurality of RTK double-difference wide-lane ambiguities $\nabla \Delta N_{WL}^{ij}$ (RTK) for satellites i and j (with respect to the mobile receiver and the reference receiver) and the single-difference wide-lane ambiguity, $\nabla N_{WL}^{ij}$ (ref) from the reference receiver to derive or estimate, at the mobile receiver, the respective single-difference ambiguities, $\nabla N_{WL}^{ij}$ (rove), in accordance with the following equation:

$$\nabla N_{WL}^{ij}(\text{rove}) = \nabla \Delta N_{WL}^{ij}(RTK) + \nabla N_{WL}^{ij}(\text{ref});$$

communicating wirelessly the derived or estimated respective single-difference ambiguities, $\nabla N_{WL}^{ij}$ (ref) to the mobile receiver.

16. The method according to claim 1 further comprising:

using a rover position X(rove) of the mobile receiver and corresponding covariance matrix $Q_{XYZ}$ (rove) as virtual measurements to be applied to constrain the one or more predictive filters comprising a narrow-lane filter.

17. A mobile receiver for determining a precise position based on correction data received from a correction data source, the mobile receiver comprising:

a data processor;

an electronic data processing system comprising the data processor;

a measurement module for measuring carrier phase of a plurality of received satellite signals of at least five satellites, the measured carrier phase comprising rover carrier phase measurements observed at the mobile receiver;

a wireless device in communication with the mobile receiver configured to receive aiding data and correction data, a data storage device associated with the mobile receiver to store the aiding data provided by a reference receiver, the aiding data comprising reference carrier phase measurements, observed at the reference receiver, and one or more of the following: aiding resolved wide-lane ambiguities of the reference receiver, aiding estimated narrow-lane ambiguities of the reference receiver, aiding estimated tropospheric delay bias of the reference receiver, pseudorange of the received satellite signals observed at the reference receiver, and reference receiver position, wherein the reference carrier phase measurements comprise raw measured carrier phase;

a relative positioning module for applying a real-time kinematic (RTK) filter to said carrier phase measurements to provide a relative position vector between the reference receiver and the mobile receiver and to provide recovery data comprising a plurality of fixed or resolved double-difference (DD) ambiguities of said carrier phase measurements, where said carrier phase measurements refer to the reference carrier phase measurements and the rover carrier phase measurements;

a precise positioning module for applying the relative position vector, the aiding data, the recovery data from the RTK filter, and correction data as inputs to one or more predictive filters, of the mobile receiver, for resolving a plurality of wide-lane and narrow-lane ambiguities in accordance with a precise positioning algorithm to facilitate convergence of the one or more predictive filters on floating or converged state of the narrow-lane ambiguities and wide-lane ambiguities in said carrier phase measurements, where narrow-lane ambiguities are determined under constraints of the inputs, the correction data comprising precise clock and orbit information on the received satellite signals; and a navigation positioning estimator that estimates a precise position of the mobile receiver based on convergence of the estimated narrow-lane ambiguities, of said carrier phase measurements, and resolved wide-lane ambiguities in the one or more predictive filters of the mobile receiver, where the the measurement module, the relative positioning module, the precise positioning module and the navigation positioning estimator are stored in the data storage device to be executable by the data processor of the electronic data processing system.

18. The mobile receiver according to claim 17 wherein the reference receiver is stationary or mobile, and wherein the reference position comprises a precise point positioning reference position of the reference receiver, and wherein the recovery data includes one or more of the following: RTK double-difference (DD) wide-lane integer ambiguity, $\nabla\Delta N_{WL}^{ij}$ (RTK); RTK fixed refraction-corrected (RC) double-difference (DD) float ambiguity, $\nabla\Delta N_{RC}^{ij}$ (RTK); a relative position between the reference receiver and the mobile receiver; a variance of the relative position; and a co-variance of the relative position.

19. The mobile receiver according to claim 17 wherein the aiding data further comprises one or more of the following estimated at the reference receiver: residual tropospheric bias, estimated refraction-corrected ambiguities, code phase, and tropospheric delay at zenith direction.

20. The mobile receiver according to claim 17 wherein the recovery data of the plurality of fixed or resolved double-difference (DD) ambiguities comprises resolved L1/L2 (double-difference) DD ambiguities from RTK filter at the mobile receiver based on raw measured carrier phase, where L1/L2 refers to an L1 carrier phase signal for a respective satellite, or an L2 carrier phase signal for the respective satellite, or both L1 carrier phase signal and L2 carrier phase signal for the respective satellite.

21. The mobile receiver according to claim 17 wherein the real-time kinematic (RTK) filter is adapted to estimate a relative position of the mobile receiver or the relative position vector between the mobile receiver and the reference receiver based on a set of real-time kinematic (RTK) algorithms to resolve the plurality of fixed or resolved double-difference (DD) ambiguities comprising a plurality of L1/L2 double-differenced (DD) fixed integer values ($N_1$, $N_2$) between the reference receiver, mobile receiver and reference satellite (per GNSS system) at an L1 carrier phase signal and between the reference receiver, mobile receiver and the same reference satellite (per GNSS system) at an L2 carrier phase signal, where L1/L2 refers to an L1 carrier phase signal for a respective satellite, or an L2 carrier phase signal for the respective satellite, or both L1 carrier phase signal and L2 carrier phase signal for the respective satellite.

* * * * *